(12) United States Patent
Covey et al.

(10) Patent No.: US 12,716,876 B2
(45) Date of Patent: Aug. 25, 2026

(54) SYSTEM AND METHODS FOR SAMPLE PROCESSING WITH MASS SPECTROMETRY INCORPORATING MAGNETIC BEADS

(71) Applicant: DH Technologies Development Pte. Ltd., Singapore (SG)

(72) Inventors: Thomas R. Covey, Newmarket (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 344 days.

(21) Appl. No.: 18/565,850

(22) PCT Filed: Jun. 3, 2022

(86) PCT No.: PCT/IB2022/055211
§ 371 (c)(1),
(2) Date: Nov. 30, 2023

(87) PCT Pub. No.: WO2022/254404
PCT Pub. Date: Dec. 8, 2022

(65) Prior Publication Data

US 2024/0255473 A1 Aug. 1, 2024

Related U.S. Application Data

(60) Provisional application No. 63/196,317, filed on Jun. 3, 2021.

(51) Int. Cl.

| | |
|---|---|
| ***G01N 30/06*** | (2006.01) |
| ***G01N 30/02*** | (2006.01) |
| ***G01N 30/72*** | (2006.01) |

(52) U.S. Cl.
CPC ......... *G01N 30/06* (2013.01); *G01N 30/7233* (2013.01); *G01N 2030/027* (2013.01)

(58) Field of Classification Search
CPC ............... G01N 30/06; G01N 30/7233; G01N 2030/027; G01N 35/1095; G01N 35/0098; H01J 49/0409
(Continued)

(56) References Cited

U.S. PATENT DOCUMENTS

| | | |
|---|---|---|
| 5,582,665 A | 12/1996 | Eigen et al. |
| 6,649,419 B1 | 11/2003 | Anderson |

(Continued)

FOREIGN PATENT DOCUMENTS

| | | |
|---|---|---|
| CN | 101019026 A | 8/2007 |
| CN | 101842161 A | 9/2010 |

(Continued)

OTHER PUBLICATIONS

Ghislain, et al ("A new platform for high-throughput mass spectrometry: acoustic droplet ejection with an open port sampling interface" Jan. 1, 2018, pp. 1749-1756 (Year: 2018).*

(Continued)

*Primary Examiner* — Michael Maskell
(74) *Attorney, Agent, or Firm* — Merchant & Gould P.C.

(57) ABSTRACT

A system for analyzing a sample includes a sample preparation sub-system for preparing at least one sample in a sample vessel and a magnetic bead storage sub-system. A sample intake sub-system receives the at least one sample. A mass spectrometer (MS) is communicatively coupled to the sample intake sub-system. A transfer sub-system includes a tool for moving the sample vessel from the sample preparation sub-system to the sample intake sub-system.

18 Claims, 24 Drawing Sheets

(58) Field of Classification Search
USPC .......................................................... 250/288
See application file for complete search history.

(56) References Cited

U.S. PATENT DOCUMENTS

| | | | |
|---|---|---|---|
| 7,923,681 | B2 | 4/2011 | Collings et al. |
| 8,585,279 | B2 | 11/2013 | Rida |
| 10,103,015 | B2 | 10/2018 | Arnold et al. |
| 10,656,147 | B2 | 5/2020 | Campbell et al. |
| 2003/0134416 | A1 | 7/2003 | Yamanishi et al. |
| 2004/0229346 | A1 | 11/2004 | Kohara et al. |
| 2005/0287577 | A1 | 12/2005 | Yamamichi |
| 2008/0150521 | A1 | 6/2008 | Meeten |
| 2008/0217254 | A1 | 9/2008 | Anderson |
| 2009/0053689 | A1 | 2/2009 | Oviso, Jr. |
| 2013/0027686 | A1 | 1/2013 | Balluch et al. |
| 2013/0143324 | A1 | 6/2013 | Aleksandrova et al. |
| 2013/0337455 | A1 | 12/2013 | McNaughton et al. |
| 2017/0246625 | A1 | 8/2017 | Becker et al. |
| 2017/0316926 | A1 | 11/2017 | Arnold et al. |
| 2018/0369831 | A1 | 12/2018 | Arnold et al. |
| 2019/0346435 | A1 | 11/2019 | Yanik et al. |
| 2020/0043712 | A1 | 2/2020 | Arnold et al. |
| 2020/0360879 | A1 | 11/2020 | Arnold et al. |
| 2020/0365382 | A1 | 11/2020 | Arnold et al. |
| 2022/0088601 | A1 | 3/2022 | Orion et al. |
| 2023/0096792 | A1 | 3/2023 | Arnold |
| 2023/0236201 | A1 | 7/2023 | Covey |
| 2023/0405594 | A1 | 12/2023 | Liu |
| 2024/0053356 | A1 | 2/2024 | Liu |
| 2025/0296089 | A1 | 9/2025 | Faur |
| 2025/0303403 | A1 | 10/2025 | Patel |

FOREIGN PATENT DOCUMENTS

| | | | | |
|---|---|---|---|---|
| CN | 109073518 A | 12/2018 | | |
| EP | 2015074 A1 | 1/2009 | | |
| EP | 2440941 | 4/2012 | | |
| EP | 2581746 | 4/2013 | | |
| WO | 00/25922 | 5/2000 | | |
| WO | 02/090565 | 11/2002 | | |
| WO | 2004/004874 | 1/2004 | | |
| WO | 2015/128725 | 9/2015 | | |
| WO | 2016/063389 | 4/2016 | | |
| WO | 2016/118489 | 7/2016 | | |
| WO | 2017/093896 | 6/2017 | | |
| WO | 2018/138631 | 8/2018 | | |
| WO | 2018/217778 | 11/2018 | | |
| WO | WO-2018217778 A1 * | 11/2018 | ............. | H01J 49/04 |
| WO | 2019/102355 | 5/2019 | | |
| WO | 2019/126363 | 6/2019 | | |
| WO | 2019/234708 | 12/2019 | | |
| WO | 2020/003233 | 1/2020 | | |
| WO | 2020/079647 | 4/2020 | | |
| WO | 2021/203005 | 10/2021 | | |
| WO | 2021/234640 | 11/2021 | | |
| WO | 2023/121990 | 6/2023 | | |

OTHER PUBLICATIONS

Choi, Yongsoo et al., "Development of a Screening Assay for Ligands to the Estrogen Receptor Based on Magnetic Microparticles and LC-MS", Combinatorial Chemistry and High Throughput Screening, vol. 11, No. 1, Jan. 1, 2008, pp. 106.

Ghislain Luke et al., "A new platform for high-throughput mass spectometry: acoustic droplet ejection with an open port probe sampling interface", Rapid Communications in Mass Spectrometry, Jan. 1, 2018, pp. 1749-1756.

Hager et al., "Product Ion Scanning Using a Q-q-Qlinear ion trap (QTRAP) Mass Spectrometer", Rapid Communications in Mass Spectrometry, 2003; 17: 1056-1064.

Jegatha Nambi Krishnan et al., "Rapid microfluidic separation of magnetic beads through dielectrophoresis and magnetophoresis", Electrophoresis, Verlag Chemis, Hoboken, NJ, vol. 30, No. 9, May 7, 2009, pp. 1457-1463.

Johnson, Benjamin et al., "Applications of Pulsed Ultrafiltration-Mass Spectrometry", Mass Spectrometry Reviews, 2002, 21, pp. 76-86.

Jonker, Niels et al., "Direct Dynamic Protein-Affinity Selection Mass Spectrometry", Chromatographia, Jul. 2010; 72 (No. 1-2): 7-13.

Liu, Chang et al., "Fast quantitation of opioid isomers in human plasma by differential mobility spectrometry/mass spectrometry via SPME/open-port probe sampling interface", Analytica Chimica Acta, vol. 991, Aug. 28, 2017, pp. 89-94.

Moein et al., "Solid Phase Microextraction and Related Techniques for Drugs in Biological Samples", J. Anal. Methods Chem. 2014, published Feb. 13, 2014; 25 pgs.

O'Connell et al., Solution-Based Indirect Affinity Selection Mass Spectrometry—A General Tool for High-Throughput Screening of Pharmaceutical Compound Libraries, Anal. Chem., 2014, 86, pp. 7413-7420.

PCT International Preliminary Report on Patentability in International Application PCT/IB2022/055211, mailed Dec. 14, 2023, 9 pages.

PCT International Search Report and Written Opinion in International Application PCT/IB2022/055211, mailed Sep. 20, 2022, 13 pages.

Rasolzadeh, Fahimeh et al., "Magnetic fiber headspace solid-phase microextraction coupled to GC-MS for the extraction and quantitation of polycyclic aromatic hydrocarbons", Mikrochimica Acta, Springer Verlag, Vienna, AT, vol. 186, No. 7, Jun. 13, 2019, pp. 1-9.

Rush, Michael et al., "Development of a Magnetic Microbead Affinity Selection Screen (MagMASS) Using Mass Spectrometry for Ligands to the Retinoid X Receptor-[alpha]", Journal of the American Society for Mass Spectrometry, Elsevier, vol. 28, No. 3, Dec. 13, 2016, pp. 479-485.

Rush, Michael et al., "Magnetic Microbead Affinity Selection Screening (MagMASS) of Botanical Extracts for Inhibitors of 15-Lipoxygenase", Journal of Natural Products, vol. 79, No. 11, Nov. 1, 2016, pp. 2898-2902.

Van Breemen, Richard et al., "Pulsed Ultrafiltration Mass Spectrometry: A New Method for Screening Combinatorial Libraries", Anal. Chem., 1997, 69, pp. 2159-2164.

Zhang Hui et al., "Acoustic Ejection Mass Spectrometry for High-Throughput Analysis", bioRxiv, Jan. 29, 2020, retrieved from internet on Sep. 8, 2021 at: https://www.biorxiv.org/content/10.1101/2020.01.28.923938v1.full.pdf.

Zhang, Bingjie et al., "A Novel G Proten-Based and Subject-Selective Agonist for a G Protein-Coupled Receptor Discovered for Screening Herbal Extracts", ACS Central Science, vol. 6, No. 2, Jan. 23, 2020, pp. 213-225.

* cited by examiner

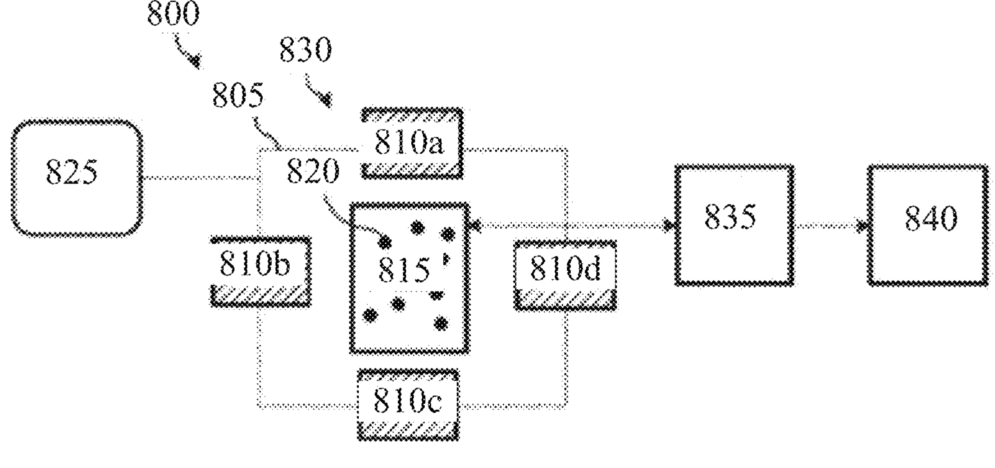
FIG. 8A
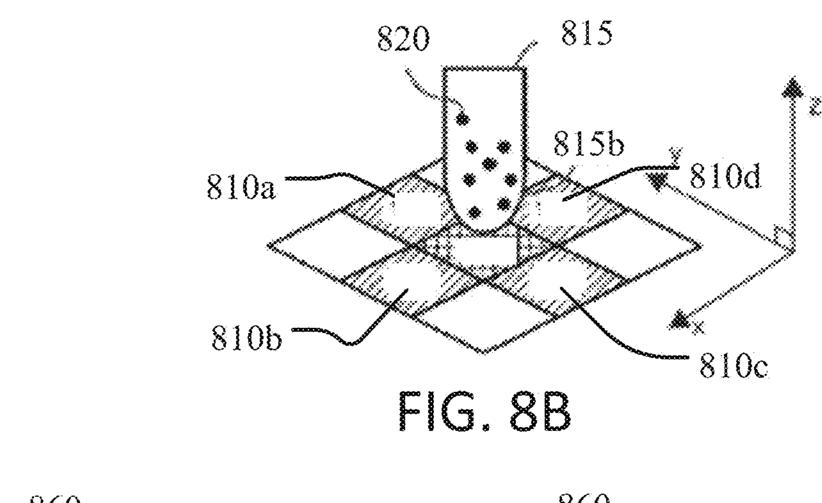
FIG. 8B
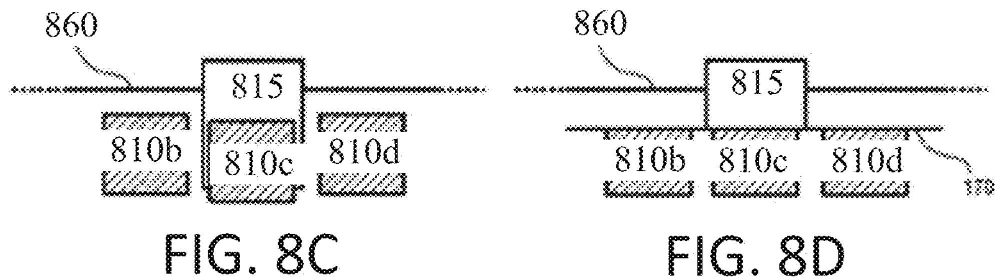
FIG. 8C
FIG. 8D

SYSTEM AND METHODS FOR SAMPLE PROCESSING WITH MASS SPECTROMETRY INCORPORATING MAGNETIC BEADS

CROSS-REFERENCE TO RELATED APPLICATIONS

This application is a National Stage Application of PCT/IB2022/055211, filed on Jun. 3, 2022, which claims the benefit of U.S. Provisional Application No. 63/196,317, filed on Jun. 3, 2021, the entire disclosures of which are incorporated herein by reference in their entireties. To the extent appropriate, a claim of priority is made to each of the above disclosed applications.

BACKGROUND

Surface functionalized magnetic particles are used widely in sample processing. The particles provide convenient automation options for removing, adding and manipulating reagents in a well-controlled manner, and have been utilized as the standard method for different workflows, such as nucleic acid purification, DNA encoded library (DEL), and protein precipitation. To automate the beads-based sample preparation, there have been several commercial systems developed in the market, such as Hamilton Microlab STAR, Beckman Coulter Biomek, and Agilent Bravo. The enabled process on these systems include beads dispensing, mechanical agitation for mixing (shaking and/or pipette mixing), temperature control for incubation, moving the sample wells to the permanent magnetic field for beads trapping, and the liquid handling (e.g. pipetting). These operations could be repeated multiple cycles for the steps of incubation, washing, and/or elution.

SUMMARY

In one aspect, the technology relates to a system of analyzing a sample, the system including: a sample preparation sub-system for preparing at least one sample in a sample vessel; a magnetic bead storage sub-system; a sample intake sub-system for receiving the at least one sample; a mass spectrometer (MS) communicatively coupled to the sample intake sub-system; and a transfer sub-system including a tool for moving the sample vessel from the sample preparation sub-system to the sample intake sub-system. In an example, the sample preparation sub-system includes an electromagnetic mixer for mixing the sample with a plurality of magnetic beads. In another example, the sample preparation sub-system includes a mechanical mixer for mixing the sample with a plurality of magnetic beads. In yet another example, the system further includes a mixing sub-system for mixing a plurality of magnetic beads in a liquid. In still another example, the sample preparation sub-system includes at least one of a sample introduction state, a wash station, and a surface modification station.

In another example of the above aspect, the system further includes a magnetic bead transfer sub-system for moving a plurality of magnetic beads from the magnetic bead storage sub-system to a predetermined sub-system of the system In an example, the magnetic bead transfer sub-system includes at least one of an electromagnetic tool and a magnetic tool. In another example, at least one of the sample preparation sub-system and the transfer sub-system includes an incubator. In yet another example, the sample intake sub-system includes a liquid chromatography (LC) column. In still another example, the sample intake sub-system includes an open port interface (OPI).

In another example of the above aspect, the sample intake sub-system includes an acoustic droplet ejector (ADE). In an example, the transfer sub-system is configured to move the sample vessel from the sample preparation sub-system to the sample intake sub-system.

In another aspect, the technology relates to an automated method of analyzing a sample, the automated method including: introducing a plurality of magnetic beads to the sample, wherein the sample is contained within a sample vessel; transferring the sample vessel to a sample intake sub-system; introducing the sample from the sample vessel to the sample intake sub-system, wherein the sample intake sub-system is communicatively coupled to a mass spectrometer (MS); analyzing the sample with the MS; and removing the plurality of magnetic beads from the sample prior to analysis of the sample by the MS. In an example, removing the plurality of magnetic beads from the sample prior to analysis of the sample by the MS includes removing the plurality of magnetic beads from the sample prior to introducing the sample to the sample intake sub-system. In another example, introducing the plurality of magnetic beads to the sample includes transferring the plurality of magnetic beads from a suspension to the sample. In yet another example, introducing the sample from the sample vessel to the sample intake sub-system includes ejecting the sample and the plurality of magnetic beads from the sample vessel to the sample intake sub-system. In still another example, the automated method further includes introducing at least one reagent to the sample vessel containing the sample and the plurality of magnetic beads.

In another example, of the above aspect, the automated method further includes incubating the at least one reagent, the sample, and the plurality of magnetic beads. In an example, incubating the sample includes at least one of heating the sample and cooling the sample. In another example, removing the plurality of magnetic beads from the sample includes at least one of: removing the plurality of magnetic beads from the sample vessel prior to analyzing the sample; and removing the sample from the sample vessel containing the sample and the plurality of magnetic beads, prior to analyzing the sample. In yet another example, removing the plurality of magnetic beads from the sample vessel includes inserting a magnet into the sample vessel. In still another example, removing the plurality of magnetic beads from the sample includes capturing the plurality of magnetic beads in at least one of an open port interface, a transfer conduit, an ionization source, and a vacuum chamber.

In another example of the above aspect, analyzing the sample includes eluting the sample. In an example, introducing the sample from the sample vessel to the sample intake sub-system includes ejecting the sample.

BRIEF DESCRIPTION OF THE DRAWINGS

FIGS. 8A-8D depict examples of sample preparation sub-systems that may be incorporated into the system of FIG. 7.

DETAILED DESCRIPTION

Figure 1:
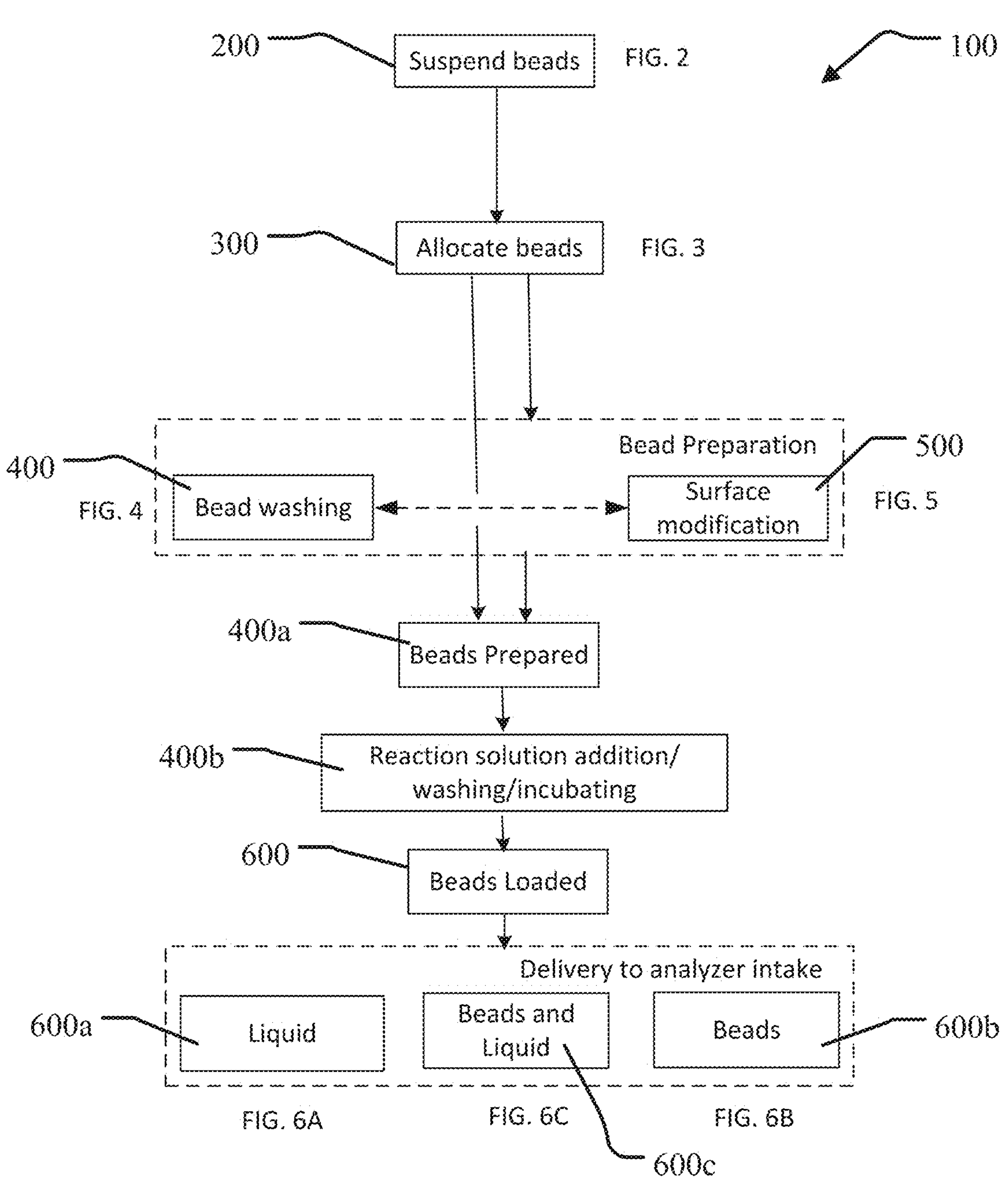
FIG. 1 depicts an automated method incorporating the use of magnetic particles in a sample processing system for mass spectrometry.

The technologies described herein directly integrated systems for processing samples using magnetic beads to an analysis system, which may be a mass spectrometer (MS) or liquid chromatography mass spectrometer (LC/MS). The sample wells/plate may be prepared at a station of the integrated system, prior to being moved to the autosampler of the MS or LC-MS before the analysis. The integrated system may also combine an electromagnetic mixing system that may be integrated within the automatic sample processing workflow. Additionally, an open port interface may be integrated into the system that used beads-based sample processing with the MS read-out. This disclosure introduces options of new beads-based workflows, and their direct integration with the MS measurement. These workflows are integrated into a single system including an LC/MS or MS analyzer. The prepared samples may be introduced to the MS analyzer via direct (e.g., contact) introduction, or via non-contact introduction systems (such as acoustic droplet ejection (ADE)). A processing workstation may be included for preparing the microplate samples, as well as storage and mixing stations for the magnetic beads to be utilized in the various processes. The description that follows describes first generally the technologies incorporated into the integrated system, followed by example, generalized methods that may be performed by the integrated system and sub-systems thereof. Thereafter, the single integrated system is depicted, along with more detailed descriptions of sub-systems and particular methods performed by said sub-systems.

Affinity selection by mass spectrometry (ASMS) involves the binding of candidate molecules to immobilized or soluble receptors and has been used for screening large compound libraries in a time and cost-effective manner. The conventional ASMS workflow is based on solution phase incubation, wherein a target protein in solution is added to a mixture of the drug molecules. The unbounded drug molecules are then separated from the drug-protein complex by mechanisms such as ultrafiltration, spin-column, and size-exclusion chromatography. After separation based on molecular weight, the protein-drug complex and the unbounded protein are injected to a reverse-phase LC/MS for analysis. The drug molecules detected by MS (released in LC) are identified with the binding affinity to the target protein. However, the analysis speed according to convention methodologies is limited due to time-consuming separation (i.e. elution) of free drugs from the protein-drug complex using LC.

In solid phase ASMS, an enzyme on the surfaces of solid phase devices may be inserted into a drug mixture in solution to capture drug molecules with affinity to the solid phase surfaces of the solid phase devices. Examples of such solid phase devices include magnetic particles and Solid Phase MicroExtraction (SPME) fibers, however in comparison with other solid-phase devices like SPME fibers, magnetic particles have much more surface area, which improves capture sensitivity. In one such approach, MagMASS (J. Nat. Prod. 2016, 79, 2898-2902), magnetic particles are used to "fish-out" the drug molecules with the protein binding affinity, while leaving the un-bounded drugs in the solution. If necessary, the magnetic particles can be washed before elution of the drug molecules to the liquid phase and ejection to LC/MS or MS.

An open-port sampling interface (OPI) may be used for direct sampling of solid phase substrates with bounded drug molecules, such as SPME fibers (see, e.g., U.S. Pat. No. 10,103,015, the disclosure of which is hereby incorporated by reference herein in its entirety). The solid phase devices are magnetic particles that use a magnet (e.g., electromagnet) for transfer of the magnetic particles between sample wells and/or from a sample well to the OPI, e.g., as depicted in PCT/IB2018/089146, the disclosure of which is hereby incorporated by reference herein in its entirety). Care must be taken when using an OPI to transfer the magnetic particles to a MS port to avoid the magnetic particles being ingested into the MS. Such bead removal features are described herein.

The following references are relevant as background and are incorporated by reference herein in their entireties: Solid Phase Microextraction and Related Techniques for Drugs in Biological Samples by Moen et al., J. Anal. Methods Chem. 2014, published Feb. 13, 2014; Direct Dynamic Protein-Affinity Selection Mass-Spectrometry by Niels Jonker et al., Chromatographia, 2010 July; 72(1-2): 7-13; Solution-Based Indirect Affinity Selection Mass Spectrometry—A General Tool for High-Throughput Screening of Pharmaceutical Compound Libraries by O'Connell et al., Anal. Chem., 2014, 96, pp. 7413-7420; Pulsed Ultrafiltration Mass Spectrometry: A New Method for Screening Combinatorial Libraries by Richard B. van Breemen et al., Anal. Chem., 1997, 69, pp. 2159-2164; Magnetic Microbead Affinity Selection Screening (MagMASS) of Botanical Extracts for Inhibitors of 15-Lipoxygenase by Michael D Rush, et al., J. Nat. Prod. 2016, 79, pp. 2898-2902; APPLICATIONS OF PULSED ULTRAFILTRATION-MASSSPECTROMETRY by Benjamin M. Johnson, Mass Spectrometry Reviews, 2002, 21, pp. 76-86; WO2017/093896 A1 (Don W. Arnold, et al.) and WO2019/102355 A1 (Don W. Arnold, et al.)

Acoustic droplet ejection (ADE) is combined with the OPI to provide a sample introduction system for high-throughput mass spectrometry. When an ADE device and OPI are coupled to a mass spectrometer as described, the system can be referred to as an acoustic ejection mass spectrometry (AEMS) system. The analytical performance (sensitivity, reproducibility, throughput, etc.) of an AEMS system depends on the performance of the ADE device and the OPI. The performance of the ADE device and the OPI depends on selecting the operational conditions or parameters for these devices.

With these above general sub-systems and methods in mind, FIG. 1 depicts an automated method 100 incorporating the use of magnetic particles in a sample processing system for mass spectrometry. The automated method 100 includes a number of sub-processes that are described in more detail in FIGS. 2-6C, as indicated in FIG. 1. In general, however, the method 100 includes suspending a plurality of beads, operation 200; the beads may be stored in a storage sub-system, which may be accessible by a robot sub-system that includes a tool in the form of a electromagnetic or magnetic probe or pipette, as described in more detail herein. The beads may be suspended either in the storage vessel or in another vessel, prior to allocation thereof, operation 300. Allocation contemplates distributing the magnetic beads to one or more sample wells, e.g., as arranged in a microplate. Each sample well may contain a sample including, for example, one or more analytes. Once allocated in the sample well(s), the beads may either be further prepared (e.g., as in operations 400 and/or 500), or the beads are considered loaded (operation 600), and ready for delivery to an analyzer intake sub-system. In operation 400, beads may be washed; in operation 500, the surface of the beads may be modified, for example, by the introduction of reagents thereto, which will bond with analytes disposed on the surface of the beads. One or more washing operations 400 or surface modification operations 500 may be performed in a preparation sub-system.

Figure 4:
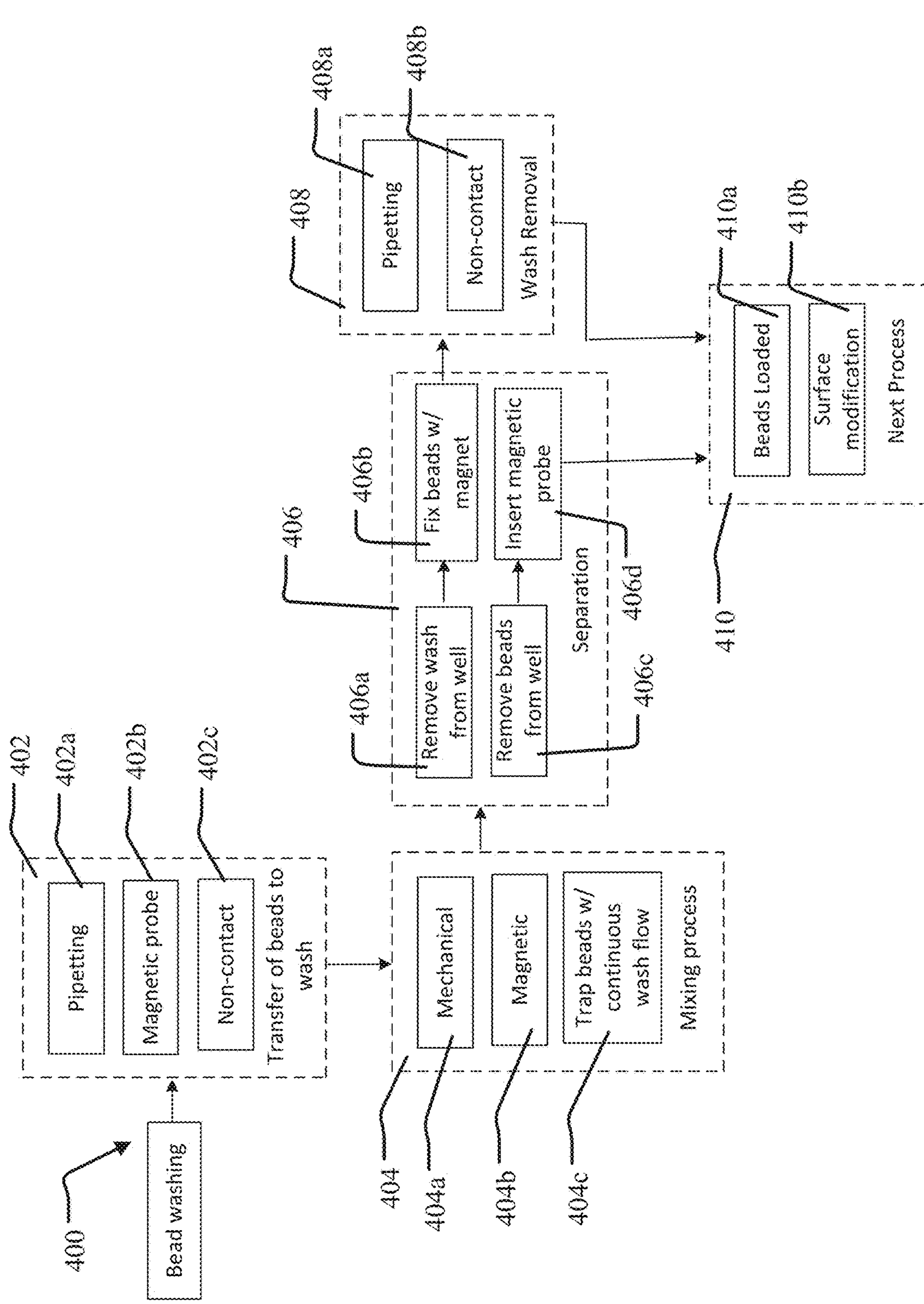
Figures 5, 5A, 5B:
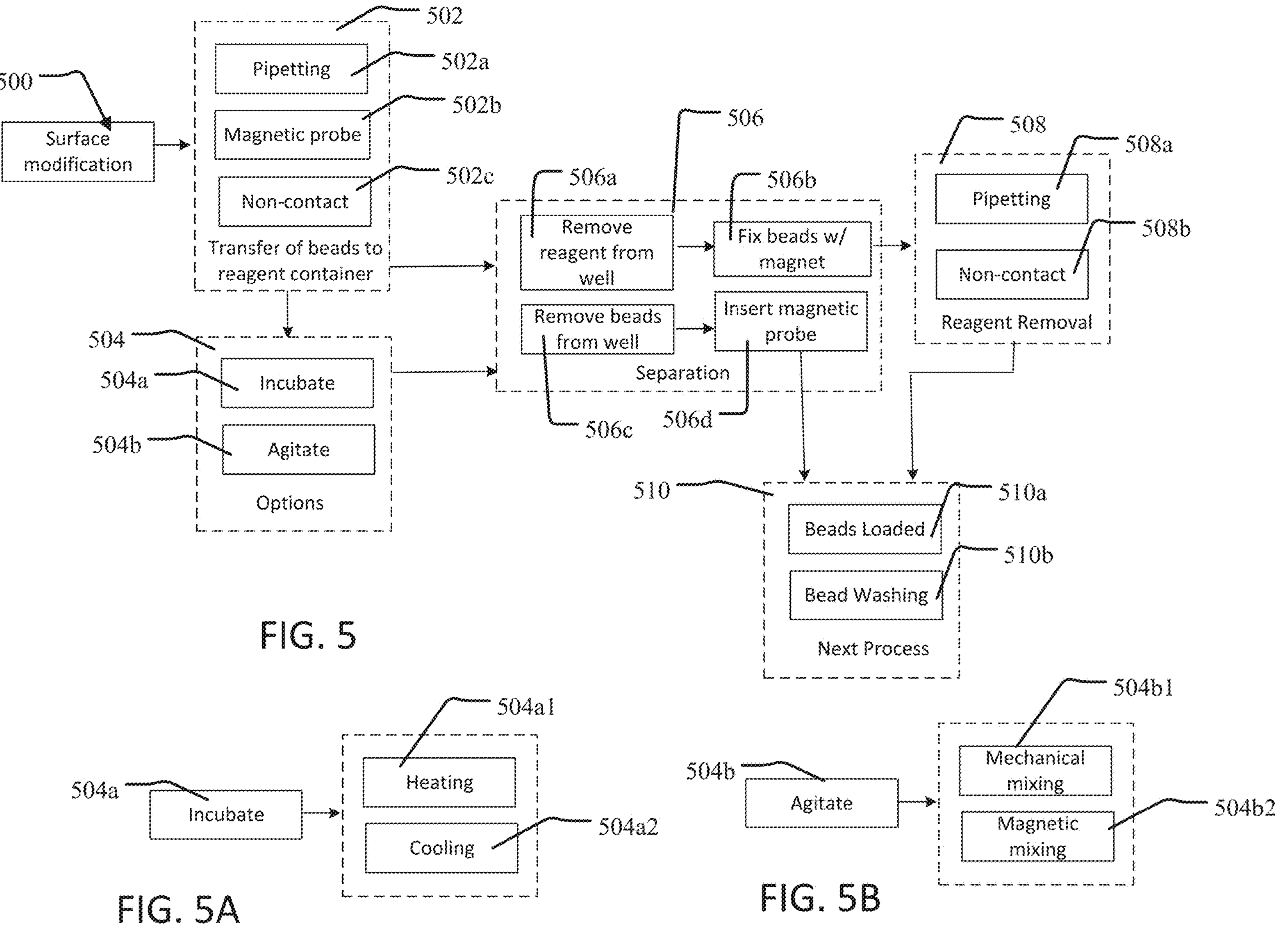

At the conclusion of allocation of the beads and any optional washing or surface modification operations, the beads are considered prepared 400*a*. At this time, a reaction solution may be introduced to the beads, along with washing and incubating operations 400*b*. These operations 400*b* are similar to those depicted in the context of bead washing 400 and surface modification 500, generally, as depicted in FIGS. 4-5B. Thereafter, the beads are considered loaded, operation 600. Once loaded, a liquid derived from further processing (e.g., elution) of the beads (operation 600*a*), or the beads themselves (operation 600*b*), or both the liquid and the beads together (operation 600*c*), may be delivered to the intake sub-system. Ultimately, analysis is performed by an analyzer sub-system.

Figure 2:
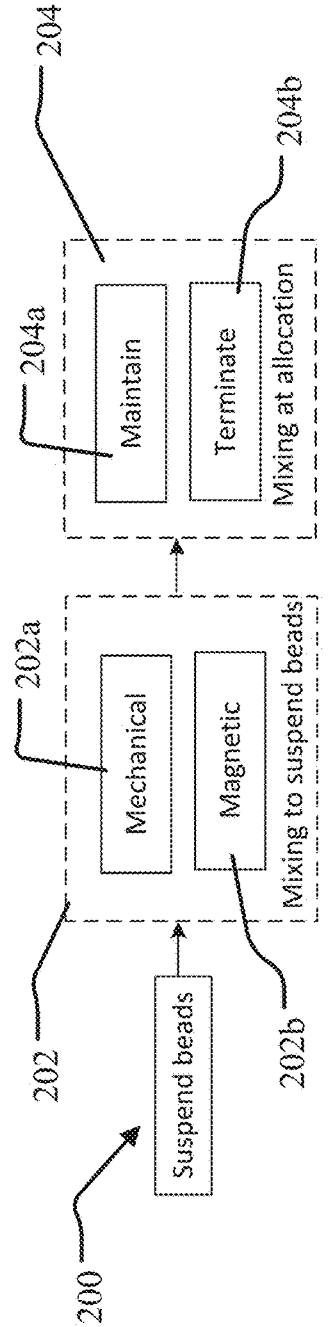
FIGS. 2-6C depict sub-processes of the method depicted in FIG. 1.
Figure 3:
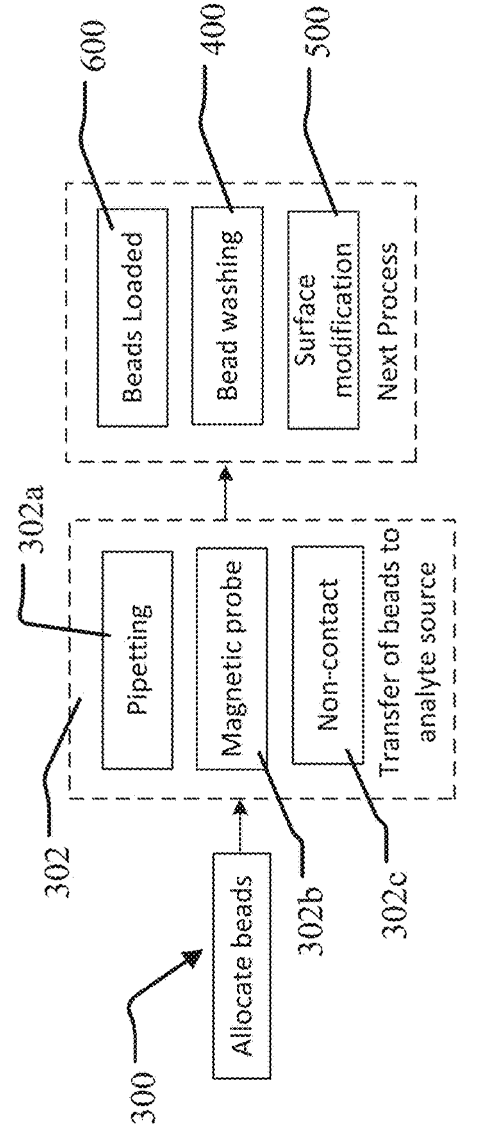

FIGS. 2-6C depict sub-processes of the method 100 described in FIG. 1. In FIGS. 1-6C, the sub-processes are described generally for illustrative purposes. Further, many detailed descriptions of certain sub-processes, and variations thereof, are described in more detail below. FIG. 2 depicts a sub-process of suspending a plurality of magnetic beads 200, which may be stored in a magnetic bead storage vessel. Prior to removal from the storage vessel, it may be desirable to mix or agitate the magnetic bead storage vessels to suspend beads evenly therein, operation 202. The mixing operations may be a mechanical mixing process, operation 202*a*, or an electromagnetic mixing process, operation 202*b*. To ensure the quantitative beads transfer, the magnetic particles should be homogeneously suspended in the bead storage container (beads stock solution) during subsequent allocation. Mixing at allocation, operation 204, may be required. If the magnetic beads settle down very quickly once the mixing mechanism is removed, the beads need to be sampled out with the active mixing is on, for example, the beads container on a magnetic mixer, operation 204*a*. For magnetic particles having the long stable time before settling, the liquid (containing beads) transfer could be conducted once the mixing mechanism was removed (either mechanical agitation or magnetic field induced mixing), 204*b*. In FIG. 3, an allocation sub-process 300 is depicted. In operation 302, the magnetic beads may be transferred or allocated to one or more sample containers, e.g., discrete sample wells in a microplate containing one or more liquid analytes. In another example, the beads may be allocated into empty wells. Bead allocation may be performed qualitatively, via a number of mechanisms. For example, the beads and the stock solution may be transferred via pipetting, operation 302*a*, via use of an electromagnetic or magnetic probe 302*b*, or via non-contact methods (such as ADE), operation 302*c*. Subsequent to allocation (and introduction of the sample analytes, if performed thereafter, the wells containing the sample analytes and beads are ready for further processing, for example, in operations 400, 500, and/or 600, as described below.

FIG. 4 depicts a first sub-process for beads preparation, a beads washing method 400. The method 400 begins with transferring the beads to a wash vessel, operation 402, which may be another well of a microplate, or another vessel structure. The beads and the analyte solution from the previous operation may be transferred via pipetting, operation 402*a*, via use of an electromagnetic or magnetic probe 402*b*, or via non-contact methods (such as ADE), operation 402*c*. Once in the wash vessel, the beads may be mixed to remove any non-specific bound reagents, operation 404. These mixing operations may include mechanical mixing, operation 404*a*, or electromagnetic mixing, operation 404*b*. In another example, magnetic beads may be trapped in an electromagnetic field and wash may be continuously flowed past the beads, operation 404*c*. Once the non-specific bound reagents are removed, the magnetic beads must be separated from the wash liquid, operation 406, for further processing. In an example, separation may include removing the wash from the well, operation 406*a*. This operation contemplates fixing the beads in a particular location within the well, operation 406*b*, for example, with an activated magnetic field. Once separated, the wash may be removed, operation 408, via pipetting 408*a* or via non-contact processes 408*b*. Another option for separation includes removing the beads from the well, operation 406*c*. This operation contemplates inserting a magnetic or electromagnetic probe into the well, operation 406*d*, to capture the magnetic beads therein. Thereafter, the beads may be moved onto subsequent processes, operation 410. The beads may be either loaded and ready for analysis, operation 410*a*, or may be subjected to a surface modification process, operation 410*b*.

FIG. 5 depicts a second sub-process for bead preparation, a surface modification sub-process 500. For some applications, the surface chemistry of the magnetic particles needs to be modified right prior to mixing with a sample, for example, the immobilization of the protein onto the beads surface before the assay. For such an operation, the allocated (optionally washed) beads could be sampled in a container (e.g., a microplate well), where it may react with other liquid phase reagents that are added into the same container via liquid transferring techniques (e.g. pipetting). Thus, the sub-process 500 begins with transferring the beads to a container or vessel, operation 502, which may be another well of a microplate, or another vessel structure. The beads and any wash solution from the previous operation may be transferred via pipetting, operation 502*a*, via use of an electromagnetic or magnetic probe 502*b*, or via non-contact methods, operation 502*c*. To improve activation of the reagent, optional operation 504, such as incubation 504*a* and/or agitation 504*b* may be performed. Incubation 504*a* may include heating 504*al* or cooling 504*a*2, as depicted in FIG. 5A. Agitation 504*b* may include mechanical mixing 504*b* 1 or electromagnetic mixing 504*b*2, as depicted in FIG. 5B. Once the reaction has completed, the magnetic beads must be separated from the reagent liquid operation 506 for further processing. In an example, separation may include removing the reagent liquid from the well, operation 506*a*. This contemplates fixing the beads in a particular location within the well, operation 506*b*, for example with an activated magnetic field. Once separated, the liquid may be removed, operation 508, for example, via pipetting 508*a* or via non-contact processes 508*b*. Another option for separation, operation 506, includes removing the beads from the well, operation 506*c*. This operation contemplates inserting a magnetic or electromagnetic probe into the well, operation 506*d*, to capture the magnetic beads therein. Thereafter, the beads may be moved to subsequent processes, operation 510. The beads may be either loaded and ready for analysis, operation 510*a*, or may be subjected to another washing process, operation 510*b*.

Once prepared, a reaction solution may be introduced to the prepared beads. These processes are similar to those depicted above in the context of FIGS. 4-5B. These operations are modified slightly and consistent with known operations in the art, including introduction of one or more a reaction solutions, performance of one or more washing operations, incubating the solution, agitating the solution, etc. Particular processes would be known to a person of skill in the art and certain examples are provided elsewhere herein. For example, the prepared beads may be added to a vessel (eg. a well on a plate) containing the reaction solution.

Figure 6A:
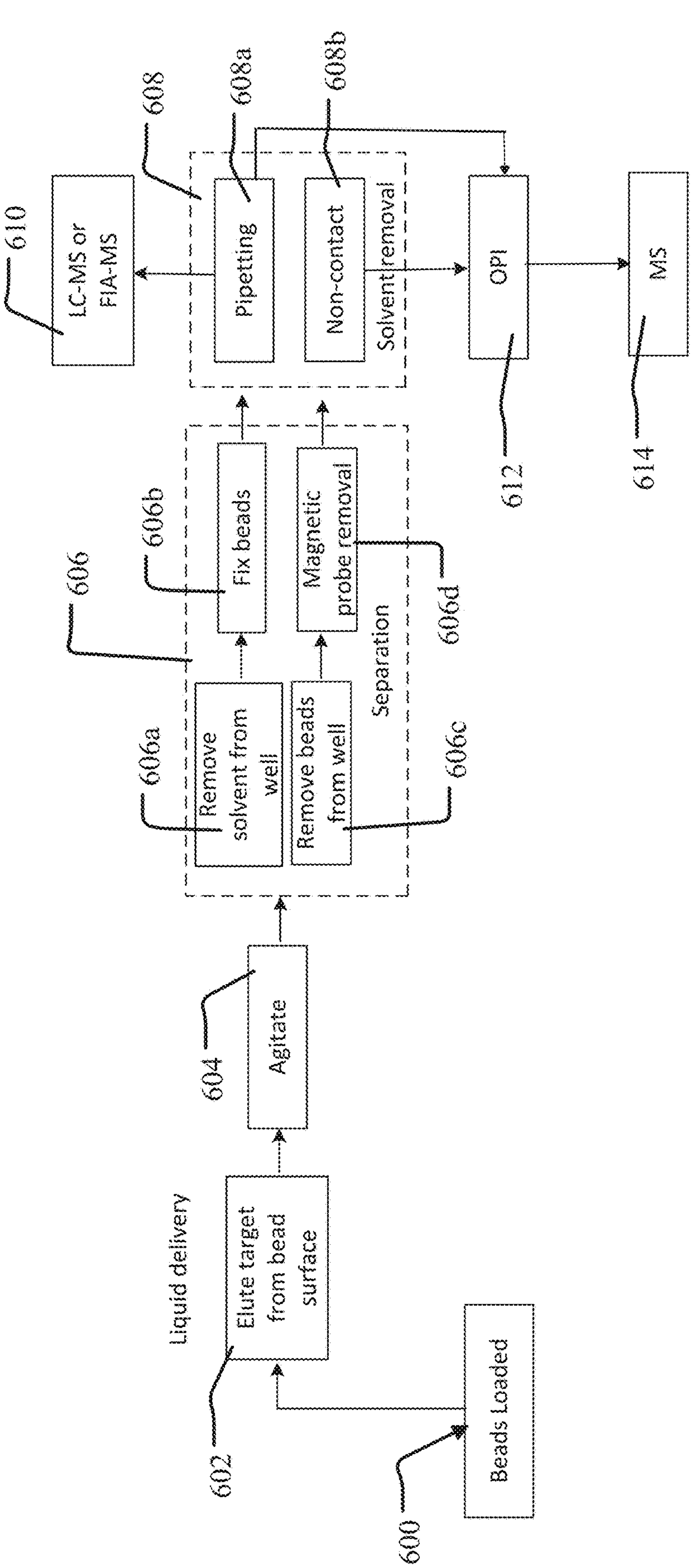
Figure 6B:
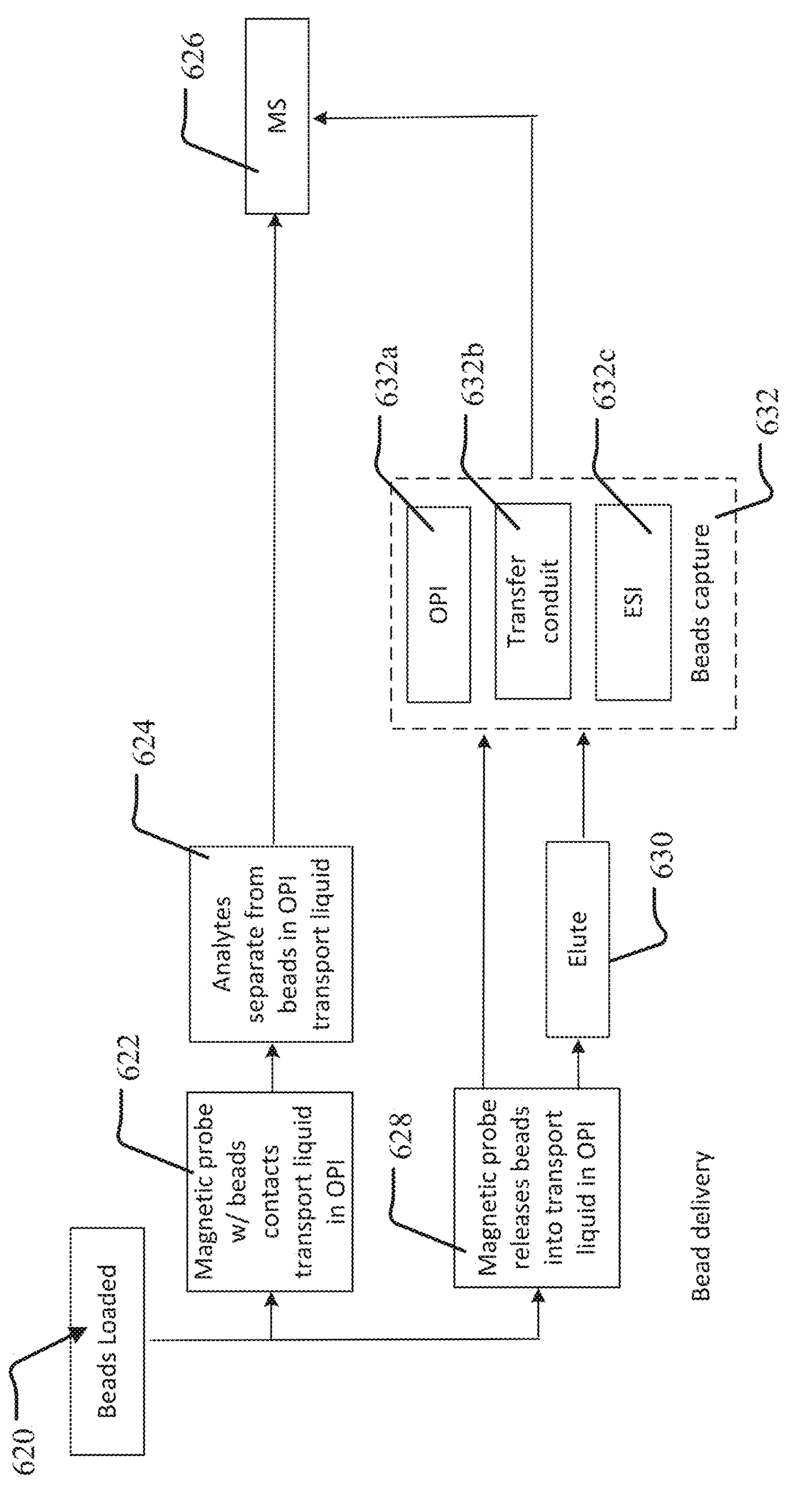
Figure 6C:
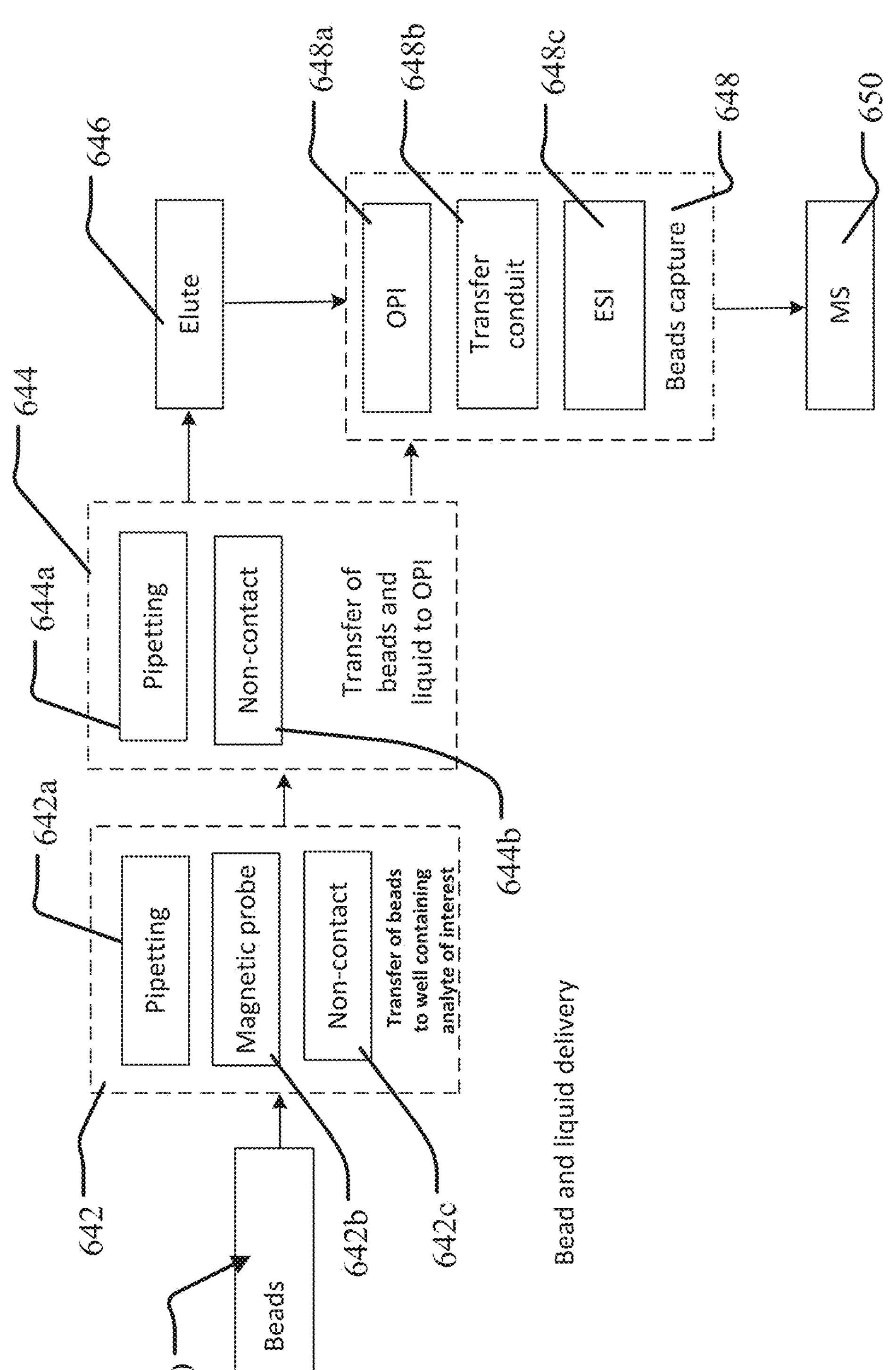

The beads are ready for delivery to an analyses sub-process once they are loaded. Various analysis sub-processes are depicted in FIGS. 6A-6C. A first sub-process 600 is depicted in FIG. 6A. There, a liquid containing compounds eluted from the magnetic beads that contained the target is delivered for analysis. Associating the magnetic beads with the target can be performed by procedures described elsewhere in the present teachings. The sub-process 600 begins with operation 602, where the target is eluted from the bead surface with a solvent. This elution may be enhanced by agitating the vessel containing the magnetic beads 604. This agitation may be consistent with the sub-processes depicted in FIG. 5B, above. Once the elution is complete, the magnetic beads must be separated from the solvent for analysis, operation 606. In an example, separation may include removing the solvent from the well, operation 606*a*. This contemplates fixing the beads in a particular location within the well, operation 606*b*, for example with an activated magnetic field. Once separated, the solvent may be removed, operation 608, for example, via pipetting 608*a* or via non-contact processes, operation 608*b*. Another option for separation, operation 606, includes removing the beads from the well, operation 606*c*. This operation contemplates inserting a magnetic or electromagnetic probe into the well, operation 606*d*, to capture the magnetic beads thereon. The resulting liquid may then be analyzed, for example, by delivering the liquid to an LC-MS or FIA-MS, operation 610. In another example, the liquid may be ejected via a non-contact process 608*b* into an intake such as an OPI, operation 612. The sample may then be analyzed with an MS, operation 614. In another example, in a variation of the pipetting step, operation 608*a*, an intake such as an OPI may involve a direct contact process in which for example, an OPI can be brought into direct contact with the liquid/solvent that allows some of the liquid to be withdrawn and transferred to the MS for analysis, operation 614.

A second sub-process 620 is depicted in FIG. 6B. Here, analytes bound to the magnetic beads may be introduced to an analyzer via an OPI. Two examples are contemplated. First, a magnetic or electromagnetic probe may be used to hold and move the beads containing a bound analyte to the OPI. The method by which the beads are bound to the analyte are described elsewhere in the present teachings. There, the beads on the probe may be placed in contact with the transport liquid that is flowing within the OPI, operation 622. Analytes on the beads may separate therefrom, and be drawn into the transport liquid in the OPI, operation 624. These analytes then travel with the transport liquid to the MS for analysis, operation 626. In another example, the magnetic or electromagnetic probe may release the beads containing the analytes into the transport liquid present in the OPI, operation 628. In an example where the transport liquid is a solvent, further elution occurs, operation 630, and the eluted analytes are released into the solvent. Regardless of whether or not the elution operation is performed, the magnetic beads must be captured, operation 632, to prevent damage to the MS 626. Capture of the beads may occur by activation of an electromagnet in the OPI 632*a*, in the transfer conduit 632*b*, or within the electrospray ionization electrode 632*c*.

A third sub-process 640 is depicted in FIG. 6C. Here, both the magnetic beads and the sample in which they are disposed may be delivered to an analyzer via an OPI. First, the beads are transferred to a well containing, for example, one or more analytes of interest, operation 642, which allows for the association of the one or more analytes to the magnetic beads. The beads can then be isolated and/or washed to remove residual non-associated analytes (not shown). The beads and any solution from a previous wash operation may be transferred via pipetting, operation 642*a*, via use of an electromagnetic or magnetic probe 642*b*, or via non-contact methods, operation 642*c*. The beads and liquid may then be transferred to an OPI, operation 644. More specifically such transfer may be performed by pipetting, operation 644*a*, or by non-contact transfer, operation 644*b*. In an example, introduction of the magnetic beads and the liquid may release analytes into the transport liquid present in the OPI. In an example where the transport liquid is a solvent, further elution occurs, operation 646, and the eluted analytes are released into the solvent. Regardless of whether or not the elution operation is performed, the magnetic beads must be captured, operation 648, to prevent damage to the MS 650. Capture of the beads may occur by activation of an electromagnet in the OPI 648*a*, in the transfer conduit 648*b*, or within the electrospray ionization electrode 648*c*.

Figure 7:
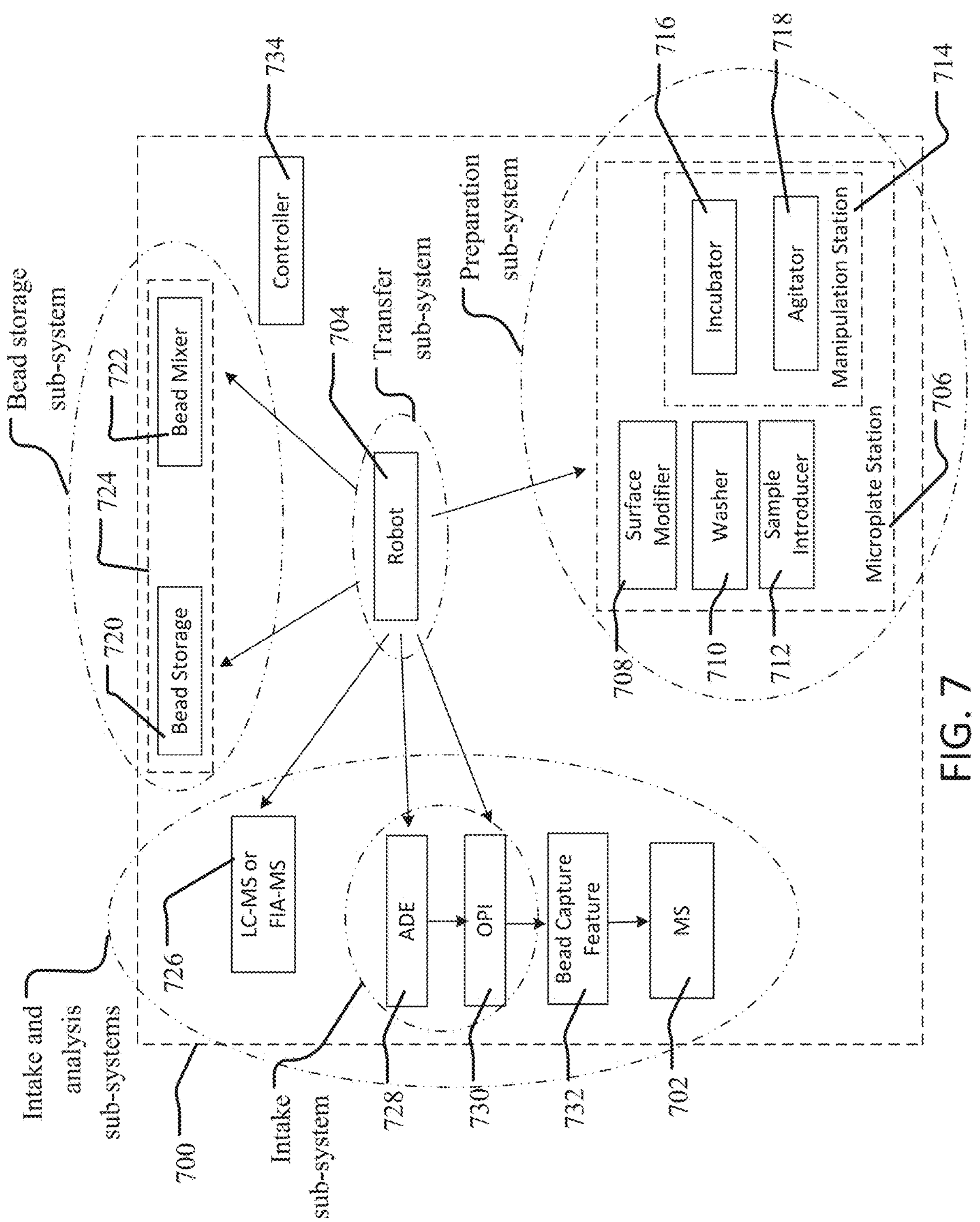
FIG. 7 depicts an automated system for preparing and analyzing with an analysis sub-system a sample incorporating magnetic particles.

FIG. 7 depicts an automated system 700 for preparing and analyzing with a mass spectrometer 702 a sample incorporating magnetic particles. The system 700 is contained within a single unit, as indicated by dashed line 700. The system 700 may include all of the sub-systems or station depicted, as well as other components, to perform the various methods depicted and described herein, as well as other methods related to use of magnetic beads in MS analysis, as would be apparent to a person of skill in the art. A number of sub-systems of the automated system 700 are depicted in FIG. 7, and described there and in further detail herein. Magnetic beads are stored in a beads storage sub-system. A preparation sub-system that is used to prepare the samples for analysis is also utilized. Once prepared the samples may be introduced to an analysis sub-system by an intake sub-system. A transfer sub-system may be used to move the microplates or other sample vessels between the various sub-systems, and all movements and processes may be coordinated by a controller. As can be seen, some overlap between sub-systems is contemplated. For example, the intake sub-system that includes an ADE and OPI may form a part of the analysis sub-system. Further, the transfer sub-system may be incorporated into the preparation sub-system; that is, the robot of the transfer sub-system may be the same component that moves or otherwise manipulates the microplate in the preparation sub-system. Other configurations are contemplated and described below.

In the depicted system 700, one or more robot sub-systems 704 are utilized to hold, distribute, and capture the various magnetic beads, containers, vessels, etc., between the sub-systems depicted therein. The robot sub-system 704 may include or utilize one or more tools, manipulators, grippers, etc. to move and otherwise manipulate various elements within the system 700. Other robot sub-systems or motive units may be utilized in specific sub-systems or stations. For example, the microplate station 706, may include a dedicated motive sub-system that may move one or more microplates between a surface modifier station 708, a wash station 710, and a sample introduction station 712. In another example, since the functions performed by these stations require similar components, a conveyor or other similar sub-system may move the microplates as required or desired, while a pipette transfers the necessary fluids between the various wells. The microplate station 706 may also include a manipulation station 714 that may include one or more of an incubator 716 for heating and/or cooling a microplate and an agitator or mixer 718, which may be mechanical or magnetic. Mechanical agitators are known in the art and may include vibrating plates upon which a microplate may be set. Examples of magnetic agitators are depicted herein in FIGS. 8A-8D.

Bead Storage Sub-System

A bead storage vessel 720 (e.g., containing a stock solution) may be accessed via the robot sub-system 704 for allocating beads to the microplates. A mixer 722 may be used for agitating bead storage containers, or the mixer 722 may be integrated with the storage vessel 720, as indicated by line 724. Once the magnetic beads are combined with the samples, and processed as required in the microplate station 706, microplates containing the samples to be tested may be transferred by the robot sub-system 704 to a plurality of MS analyzers for analysis. In one example, the robot sub-system 704 may deliver a microplate having only liquid samples (beads would have been removed in accordance with the processes described herein) to an LC-MS or FIA-MS 726. In another example, the microplates may be disposed proximate a non-contact ejection system, just as an ADE 728, where droplets (which may contain magnetic beads) may be ejected into an open port interface (OPI) 730. If magnetic beads are, in fact, ejected, a bead capture removal structure 732 may be utilized to capture the beads for later disposal to avoid damage to the downstream MS. A controller 734 may control operation, timing, and other processes of the various sub-systems or station.

Preparation Sub-System

FIGS. 8A-8D depict examples of a preparation sub-systems. Other fluid processing sub-systems are described in U.S. Published Patent Application No. 2018/0369831, the disclosure of which is hereby incorporated by reference herein in its entirety. While the system and methods described in FIGS. 1-7 above, and elsewhere herein, can be used in conjunction with many different fluid processing sub-systems, such as those of U.S. Published Patent Application No. 2018/0369831, an exemplary fluid processing sub-system 800 is illustrated schematically in FIG. 8A. It should be understood that the fluid processing sub-system 800 represents only one possible fluid processing sub-system for use in accordance with examples of the automated system described herein, and fluid processing sub-systems and/or components thereof having other configurations and operational characteristics can all be used in accordance with the systems, devices, and methods described herein as well. The fluid processing sub-systems depicted in FIGS. 8A-8D may form a part of the microplate sub-station 706 of FIG. 7, in that the fluid-processing sub-systems are used to mix samples, load fluids, etc.

FIG. 8A schematically depicts a preparation sub-system 800. As shown in FIG. 8A, the exemplary preparation sub-system 800 includes a fluid processing structure 830 having a fluid container 815 and a magnetic structure 805 configured to generate a time variant magnetic field gradient or magnetic force within the fluid container, as discussed in detail below. The fluid container 815 can generally comprise any type of container configured to hold a sample fluid, such as a sample well, a vial, a fluid reservoir, or the like, defining a fluid-containing chamber therein. As best shown in FIG. 8B, the exemplary fluid container 815 extends from an open, upper end 815*a* (open to the ambient atmosphere) to a lower, closed end 815*b* such that the fluid within the fluid container 815 can be loaded and/or removed therefrom by one or more liquid loading/collection devices 835 that can be inserted into the open, upper end 815*a*. It will be appreciated by those skilled in the art that the container 815 can include a removable cap that can be coupled to the open, upper end 815*a* (e.g., an Eppendorf tube) during various processing steps, for example, to prevent the escape of fluid during mixing, contamination, and/or evaporation. Illustrative liquid loading/collection devices 835 may include, without limitation, manual sample loading devices (e.g., pipette), multi-channel pipette devices, acoustic liquid handling devices, and/or an auto-sampler, all by way of non-limiting example.

With reference again to FIG. 8A, the sample fluid can have a plurality of magnetic particles 820 disposed therein and that can be added to the sample fluid prior to transferring the sample fluid to the fluid container 815, or can be added to the fluid container 815 before or after the sample fluid has been transferred thereto. The magnetic particles 820 or portions thereof may be formed from various magnetically susceptible materials, including, without limitation ferromagnetic materials, such as various iron oxide materials (e.g., $Fe_2O_3$, $SiO_2$ coated $Fe_2O_3$, $Fe_3O_4$, or the like). In some examples, the magnetic particles 820 may include a magnetic "core" coated with a non-magnetic coating, for example, configured to not react with the fluids and/or to selectively bind a material (e.g., a biomaterial) of interest. In some examples, at least a portion of the magnetic particles 820 may include paramagnetic beads. In an example using paramagnetic beads, at least a portion of the magnetic particles 820 may include ferromagnetic magnetic particles to agitate all of the magnetic particles in the fluid and/or to facilitate movement of the magnetic particles within the system. In some examples, the magnetic particles may include beads modified with various alkyl groups, such as C18 alkyl groups ("C18 beads"). By way of non-limiting example, such C18 beads may be used for the purification, desalting and concentration of peptides and protein digests, which is a major function of LC. It will also be appreciated by a person skilled in the art in light of the present teachings that in some examples, the magnetic particles can comprise beads that have been functionalized, for example, by being coated with antibodies ("affinity beads") to provide for selective binding of particular analytes within the sample. The magnetic particles 820 may have various shapes, such as spherical and/or rod-shaped (i.e., magnetic stir bars), such as described in International Patent Application Publication No. WO 2015/128725, the disclosure of which is hereby incorporated by reference herein in its entirety.

The magnetic structure 805 may include a plurality of electromagnets 810*a-d*. Although four electromagnets 810*a-d* are depicted in FIG. 8A, examples are not so limited as any number of electromagnets capable of operating according to various aspects of the applicant's teachings may be used. In some examples, the four electromagnets 810*a-d* may operate the same as or substantially similar to a quadrupole magnet structure. For example, a magnetic structure 805 may include 2 electromagnets, 3 electromagnets, 4 electromagnets 810*a-d,* 5 electromagnets, 6 electromagnets, 7 electromagnets, 8 electromagnets, 9 electromagnets, 10 electromagnets, or more. The electromagnets 810*a-d* may include any electromagnet known to those having skill in the art, including, for example, a ferromagnetic-core electromagnet. The electromagnets 810*a-d* may have various shapes, including square, rectangular, round, elliptical, or any other shape capable of operating consistently with the methods described herein.

As shown in FIG. 8A, the exemplary fluid processing system 800 additionally includes a controller 825 operatively coupled to the magnetic structure 805 and configured to control the magnetic fields produced by the electromagnets 810*a-d*. In examples, the controller 825 may be integrated with the system controller 734 depicted in FIG. 7, or may be a stand-alone controller specific to the microplate station 706 or mixer 702. In various aspects, the controller 825 can be configured to control one or more power sources (not shown) configured to supply an electrical signal to the plurality of electromagnets 810*a-d*. In some examples, the electrical signal can be in the form of radio frequency (RF) waveforms, DC current, AC current, or the like. Although RF waveforms are generally used herein as an example of waveforms that can be applied to the electromagnets 810*a-d* to promote mixing of the fluid sample, examples are not so limited, as any type of electrical current capable of operating as required or desired for a particular application are contemplated herein. By way of example, a DC signal can additionally or alternatively be applied to one or more the electromagnets so as to draw magnetic particles to one side of the fluid container (and out of the bulk fluid) so as to aid in fluid transfer from the container after the mixing step and/or prevent the aspiration of the magnetic particles, by way of non-limiting example. In various aspects, the controller 825 can be any type of device and/or electrical component capable of actuating an electromagnet. In some examples, the controller 825 can operate to regulate the magnetic field produced by each of the electromagnets 810*a-d* by controlling the electrical current passing through a solenoid of each of the electromagnets. In some examples, the controller 825 can include or be coupled to a logic device (not shown) and/or a memory, such as a computing device configured to execute an application configured to provide instructions for controlling the electromagnets 810*a-d*. In some examples, the application can provide instructions based on operator input and/or feedback from the fluid processing system 800. In some examples, the application can include and/or the memory may be configured to store one or more sample processing protocols for execution by the controller 825.

In various aspects, each electromagnet 810*a-d* can be individually addressed and actuated by the controller 825. For example, the controller 825 can supply RF electrical signals of different phases to each of the one or more of the electromagnets 810*a-d* such that one or more of the electromagnets generate a different magnetic field. In this manner, the magnetic field gradient generated by the magnetic structure 805 within the fluid container 815 can be rapidly and effectively controlled to manipulate the movement of magnetic particles 820 within the sample fluid. In some examples, the RF waveforms and the characteristics thereof (e.g., phase shifts) may be applied to the electromagnets 810*a-d* according to the sample processing protocol. It will be appreciated in light of the present teachings that the magnetic structures 805 can be utilized to manipulate the magnetic particles 820 within the sample fluid in various processes including, without limitation, protein assays, sample derivatization (e.g., steroid derivatization, sample derivatization for gas chromatography, etc.), and/or sample purification and desalting. Following this processing, processed fluid may be delivered to various analytical equipment 840, such as a mass spectrometer (MS) for analysis. In some examples, a single layer of electromagnets 810*a-d* (e.g., arranged at a height above the bottom 815*b* of the fluid chamber about the periphery of the fluid container) can be actuated to generate a magnetic field within the fluid container 815 that captures and/or suspends the magnetic particles 820 in a particular plane within the fluid container. For example, the magnetic particles 820 can be suspended in a particular plane to move the magnetic particles away from the bottom of the fluid container during a fluid collection process and/or for processing fluids (e.g., reagents) in a plane above material (e.g., cells adhering to the lower surface of the fluid chamber), where contact with the material on the lower surface of the fluid chamber is to be avoided.

The magnetic structures 805 may be incorporated into various fluid processing sub-systems and fluid handling devices that may be incorporated into the system 700 of FIG. 7. With reference now to FIG. 8B, an exemplary magnetic structure 805 is depicted. For instance, a magnetic structure 805 may be used as the mixing element of a magnetic mixer. In another example (not depicted) a motor-driven mixing element may cause mixing of both the liquid and the beads in a vortex condition. In some examples, the fluid container 815 (e.g., a single vial and/or a sample well of a sample plate) can be pressed against an actuator 850 to initiate the controller 825 to actuate the electromagnets 810*a-d* according to applicant's teachings. In various aspects, magnetic structures 805 can be used for mixing magnetic particles 820 within the sample wells of a sample plate, such as a conventional 4, 8, 12, or 96 well sample plate. In some examples, magnetic structures 805 may be configured to mix magnetic particles 820 within the sample wells of open-well sample plate (i.e., open-to-atmosphere, sealed with a removable covering or cap, and/or partially enclosed). As shown in FIG. 8C, the fluid container 815 (i.e., sample well) of a sample plate 860 may fit down within a cavity formed between the electromagnets 810*a-d*. In various aspects, as shown in FIG. 8D, a sample plate 860 may be placed on a portion of the fluid processing system 800, such as on a planar surface 870 thereof, such that the sample well 815 may be arranged adjacent to the electromagnets 810*a-d*.

Preparation Sub-System Incorporating a Microplate

Figure 9A:
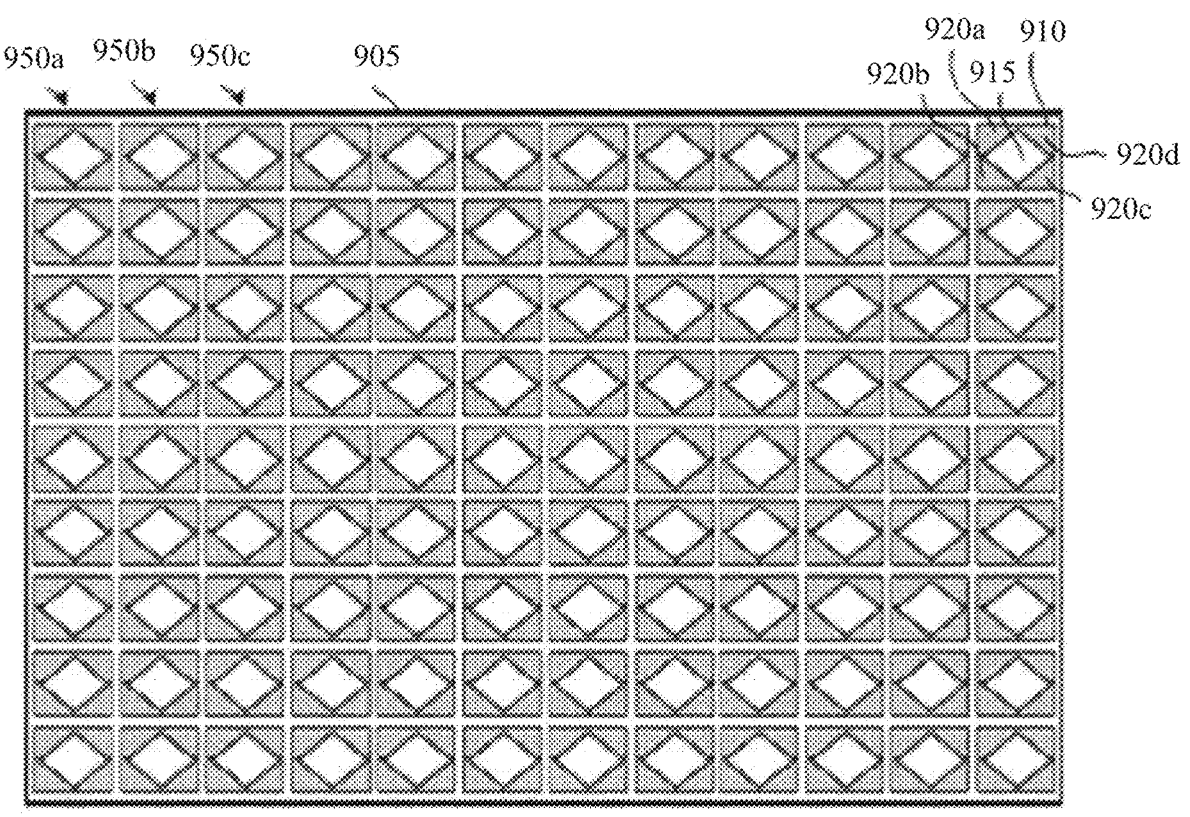
FIGS. 9A and 9B depict an illustrative open-well magnetic sample plate that may be utilized with the system of FIG. 7.

FIG. 9A depicts an exemplary open-well magnetic sample plate (e.g., microplate) that may be used in the system 700 of FIG. 7. As shown in FIG. 9A, a 96-well sample plate 905 may include a plurality of sample wells 915. Although diamond-shaped sample wells 915 are depicted in FIG. 9A, it will be appreciated that the fluid containers in accordance with the present teachings are not so limited. For instance, the sample wells 915 can have various shapes, including square, rectangular, round, elliptical, or any other shape required or desired. Each sample well 915 may be surrounded about its periphery by a magnetic structure 910 that includes a plurality of electromagnets 920*a-d*. The magnetic structures 910 and the methods of mixing magnetic particles using RF-driven oscillating magnetic fields. For example, the magnetic structures 910 can be configured to receive standard sample plate devices, such as industry standard 96-sample well arrays 905. This may be achieved, for instance, by using electromagnets 920*a-d* and magnetic structure 910 formations having a geometry that corresponds with standard sample well plates. In this manner, fluidic channels and pumps are not required, reducing and even eliminating fluid processing issues relating with these elements, including, without limitation, non-specific binding and carryover (i.e., use of disposable sample plate). In addition, the use of open-well sample systems provides for more efficient methods for sample loading and collection, such as integration with an auto-sampler and other automated fluid-handling sub-systems. In this manner, fluid processing sub-systems may allow for the simultaneous processing of large arrays of samples that is simple and efficient from a fluid manipulation and a mechanical complexity perspective. Thus, the sub-systems depicted in FIGS. 8A-9B above may be incorporated into the microplate station 706 of the system 700 depicted in FIG. 7 to improve system 700 processing speed and functionality.

In an illustrative example involving a protein processing assay, pull-down beads can be disposed within the first, leftmost column 950*a* of sample wells 915, ion-exchange beads can be disposed within the second column 950*b* of sample wells 915, and trypsin-coated beads can be disposed within a third column 950*c* of sample wells 915. In this manner, processing of the sample may only require transferring the sample from one column to another column to perform the protein processing assay, while actuating the electromagnet structures 910 surrounding each well appropriately in order to facilitate the processing step performed therein.

Figure 9B:
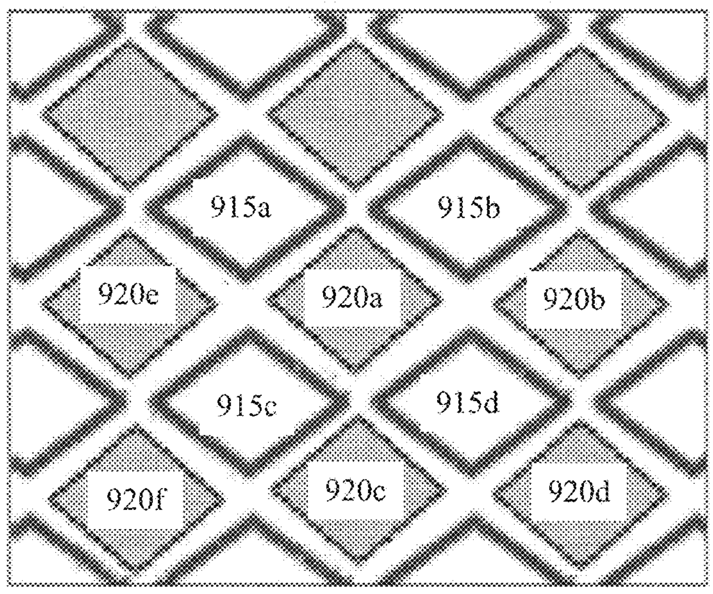

FIG. 9B depicts a layout of a plurality of sample wells 915*a-d* and associated magnetic structures that comprise electromagnets 920*a-f* that demonstrates the sharing of electromagnets 920*a-f* between multiple sample wells 915*a-d*. In this example, sample well 915*d* is surrounded by magnetic structure comprising electromagnets 920*a*, 920*b*, 920*c*, and 920*d*. Electromagnets 920*a* and 920*c* also surround sample well 915*c* that itself is also surrounded by electromagnets 920*e* and 920*f*. Electromagnets 920*a* and 920*c* can generate a magnetic field that penetrates into both sample wells 915*c* and 915*d*. Similarly sample wells 915*b* and 915*d* share electromagnets 920*a* and 920*b* and sample wells 915*a* and 915*c* share electromagnets 920*a* and 920*e*. Electromagnet 920*a* is shared by sample wells 915*a-d* and can generate a magnetic field in all four sample wells. As should be appreciated, this structure similarly repeats throughout the sample well plate 905 to all sample wells.

Transfer Sub-System and Combination Transfer/Preparation Sub-System

Figure 10:
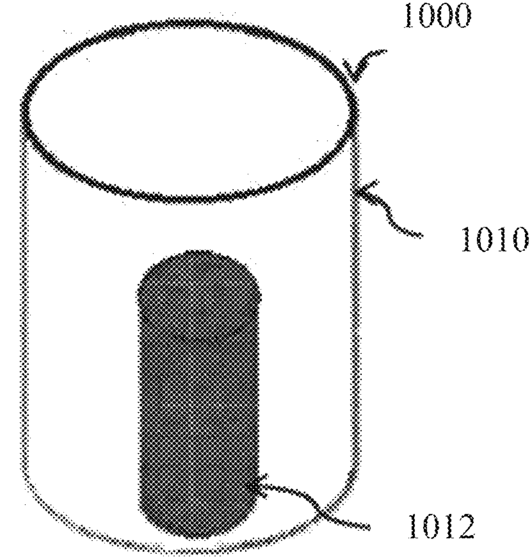
FIG. 10 illustrates an example of a sample well and an example of an electromagnetic assembly that may be utilized with the system of FIG. 7.
Figure 10:
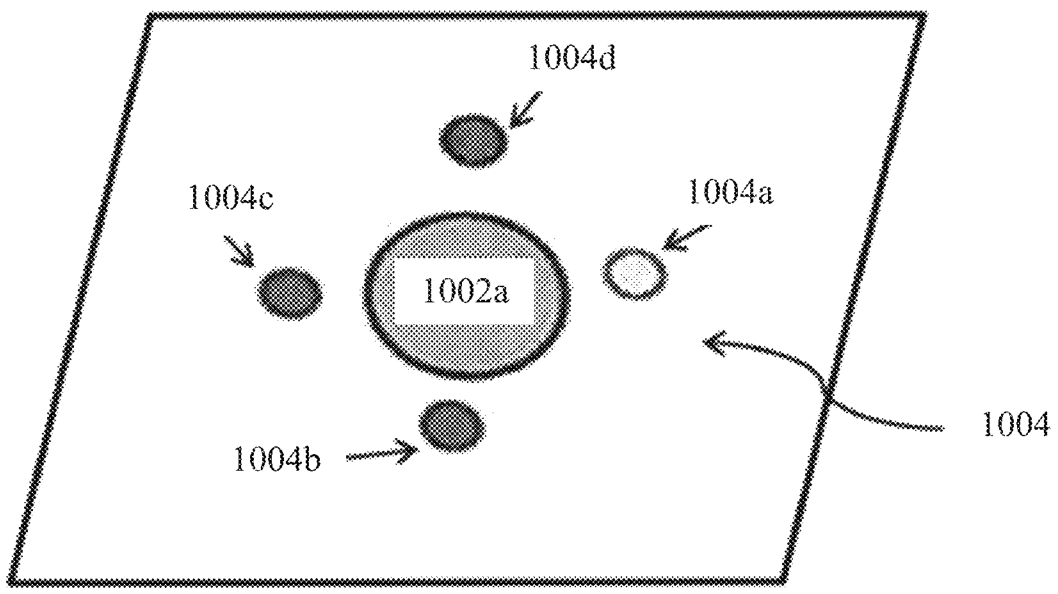

FIG. 10, depicts a movable electromagnetic assembly 1000 another example of a mixer that may be incorporated into the microplate station 706 of FIG. 7. Other electromagnetic mixers are described in PCT Application No. WO 2019/102355, the disclosure of which is hereby incorporated by reference herein in its entirety. The assembly 1000 may include a single electromagnet 1012 disposed in a shell 1010, e.g., to eliminate cross-over contaminations. In such an example, the application of an AC signal to the electromagnet 1012 with a phase that is different from the phase of any of the signals applied to the electromagnets 1004*a*-1004*d* of a respective sample well 1002*a* can cause 3-D magnetic mixing. Similar to the examples of FIGS. 8A-9B, a DC magnetic field can be used for particle trapping and delivery. The single movable electromagnetic assembly has a simple design and in some examples it can be formed with a smaller size than a movable electromagnetic assemblies having more electromagnets. In some examples, the signals applied to the electromagnets of the movable magnetic assemblies and/or those of the magnetic structures associated with the sample wells can have a frequency in a range of about less than 1 Hz (e.g., 0.5 Hz) to about 5000 Hz.

Figure 11A:
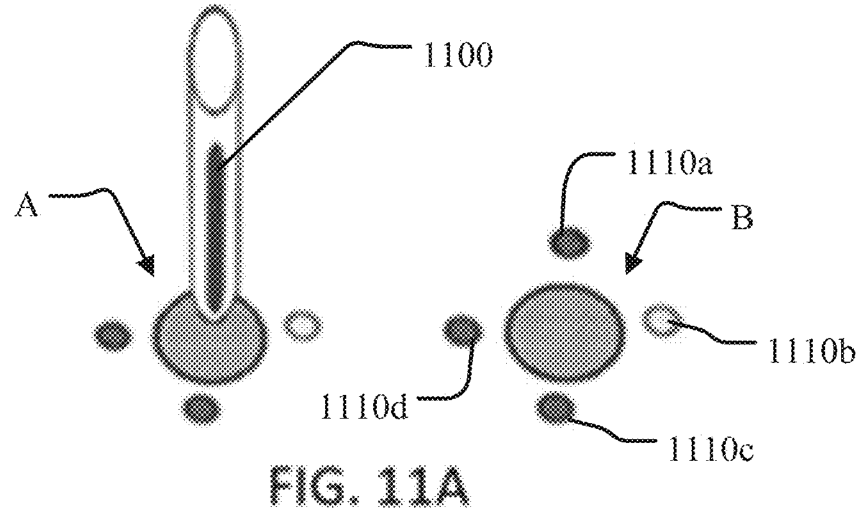
FIGS. 11A-11B schematically depict the use of a movable electromagnetic assembly that may be incorporated into a transfer sub-system of the system of FIG. 7.
Figure 11B:
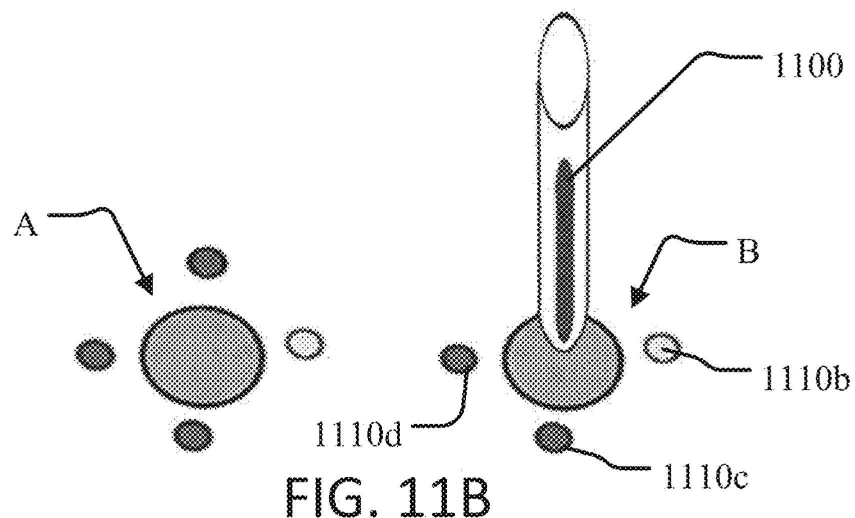
Figure 12:
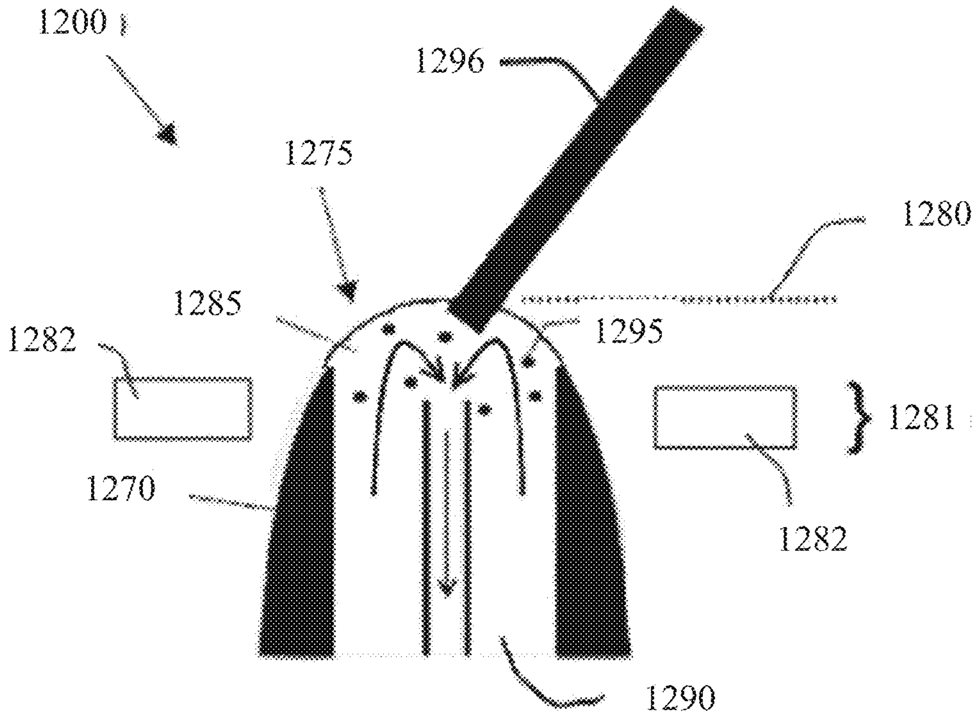
FIG. 12 depicts an open port interface that may be utilized with the system of FIG. 7.

As noted above, the robot sub-system 704 of FIG. 7 may incorporate, a movable electromagnetic assembly according to the present teachings can be employed to transfer magnetic particles, e.g., magnetic beads from one sample chamber, e.g., a sample vial, to another. By way of further illustration and with reference to FIGS. 11A to 11B, in one example, the AC signals applied to the electromagnets of a sample vial A, into which the movable electromagnetic assembly 1100 was inserted can be turned off and a DC signal can be applied to at least one of the electromagnets of the movable electromagnetic assembly 1100 to collect at least a portion of magnetic particles within the sample vial A onto the surface of the movable electromagnetic assembly 1100 (FIG. 11A). The movable electromagnetic assembly 1100 can then be removed from the sample vial A and transferred to another sample vial B (FIG. 11B). The DC signal applied to the movable electromagnetic assembly 1100 can be turned off to allow the particles collected on the movable electromagnetic assembly 1100 to enter the sample vial B. In some examples in which sample vial B includes a magnetic structure comprising a plurality of electromagnets 1110*a*-1110*d* such as those discussed above that surround sample vial B, one or more signals, such as the AC signals discussed above, can be applied to one or more of the electromagnets 1110 surrounding sample vial B to facilitate the release of the magnetic particles from the movable electromagnetic assembly 1100 into vial B, e.g., into a solution in vial B.

The robot sub-system 704 of FIG. 7 may also utilize an electromagnetic or magnetic probe to deliver magnetic particles to an OPI, such as those described herein. The OPI 1200 includes a tube 1270 having an open-ended tip 1275 that is configured to both introduce and extract solvent 1285 on a continuous basis providing a steady state level 1280 of solvent at the tip end 1275. In this particular example, the OPI 1200 comprises a first cylindrical member disposed within a second cylindrical member arranged in a co-axial arrangement. The solvent 1285 travels towards the tip end 1275 through the annular space 1290 between the two cylindrical members and then travels away from the tip end 1275 through the inner cylinder as depicted in the arrows in the figure defining the fluid path. As should be appreciated, if no inflow or outflow of fluid is present, or if inflow and outflow are constant (e.g., a condition known as "dynamic balance"), the solvent 1285 level will remain steady. The OPI 1200 can be used to extract analytes from a substrate surface that comes into contact with the solvent 1285 at the tip 1275. In several examples, small magnetic particles 1295 can be introduced into the solvent at the tip 1275 of the OPI 1200 and in combination with the fluid processing systems and magnetic assemblies and/or structures 1281, comprising electromagnets 1282 herein described, the magnetic particles can be influenced to resist the outflow of solvent 1285 from the tip end 1275 and remain in the vicinity of the tip end by virtue of the presence of the magnetic fields. In addition, the magnetic assemblies and/or structures cause the magnetic particles to spin, or travel back and forth in x, y, and z directions as confined by the presence of the magnetic fields. While the electromagnetics can typically be chosen to be sufficiently strong to prevent any escape of magnetic particles from the tip surface, a downstream permanent magnetic (not shown) can also be used to capture magnetic particles, thereby preventing any downstream analysis from contamination. This downstream magnetic functions as a bead capture sub-system and is described in further detail herein. The presence of the magnetic particles 1295 at the tip 1275 can assist in the mass transfer of analytes (or portions thereof) from a substrate surface into the solvent. A magnetic transfer probe 1296 may be used to deliver magnetic particles to the OPI 1200. As described elsewhere herein, the electromagnets 1282 need not be present, and the magnetic transfer probe 1296 may retain the magnetic particles thereon for elution with the continuously-flowing liquid within the OPI 1200.

While cylindrical members have been described above in describing the tube, it should be appreciated that other shapes with varying cross-sectional shapes may also be utilized include triangular, square, rectangular or any other multi-sided shape. The presence and mixing of the magnetic particles 1295 may also assist in the disruption of bubbles that may generate at the tip 1275. These may be caused for example by the usage of compressed gas driven pumps that are utilized to deliver solvent into the open port probe. The outflow of solvent containing an analyte to be analyzed can then be processed downstream using one or more suitable analytical instruments.

Intake Sub-System

Figure 13:
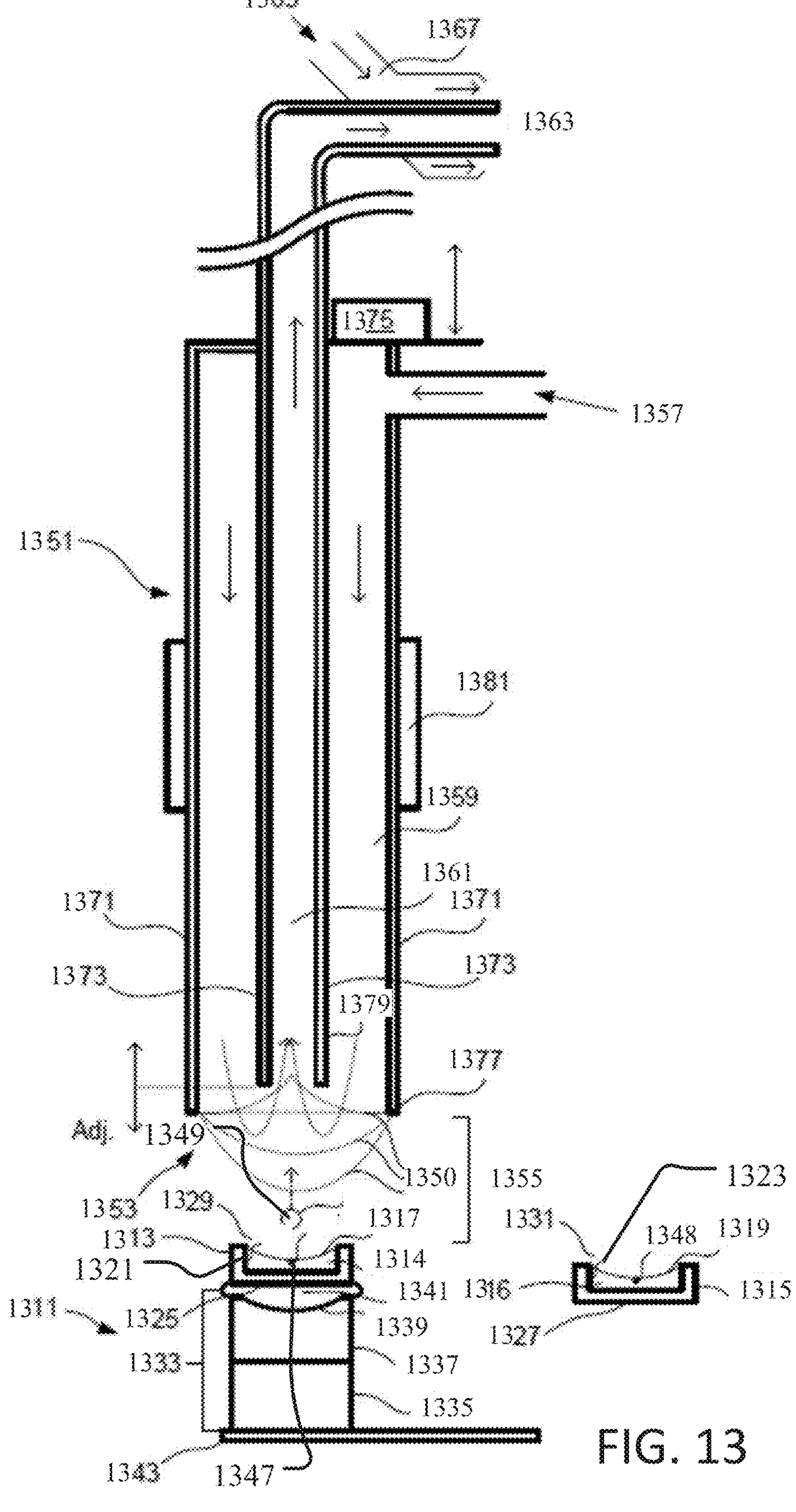
FIG. 13 depicts a sample intake sub-system that may be utilized with the system of FIG. 7.

FIG. 13 depicts a sample intake sub-system which may be used to depict loaded beads or liquids derived therefrom to an analysis system such as arms. In FIG. 13, the acoustic droplet ejection (ADE) device is shown generally at 1311, ejecting droplet 1349 toward the continuous flow sampling probe, an OPI, indicated generally at 1351 and into the sampling tip 1353 thereof.

The acoustic droplet ejection device 1311 includes at least one reservoir, with a first reservoir shown at 1313 and an optional second reservoir 1331. In some examples a further plurality of reservoirs may be provided. Each reservoir is configured to house a fluid sample having a fluid surface, e.g., a first fluid sample 1314 and a second fluid sample 1316 having fluid surfaces respectively indicated at 1317 and 1319. When more than one reservoir is used, as illustrated in FIG. 13, the reservoirs are preferably both substantially identical and substantially acoustically indistinguishable, although identical construction is not a requirement.

The ADE comprises acoustic ejector 1333, which includes acoustic radiation generator 1335 and focusing element 1337 for focusing the acoustic radiation generated at a focal point 1347 within the fluid sample, near the fluid surface. As shown in FIG. 13, the focusing element 1337 may comprise a single solid piece having a concave surface 1339 for focusing the acoustic radiation, but the focusing element 1337 may be constructed in other ways as discussed below. The acoustic ejector 1333 is thus adapted to generate and focus acoustic radiation so as to eject a droplet of fluid from each of the fluid surfaces 1317 and 1319 when acoustically coupled to reservoirs 1313 and 1315, and thus to fluids 1314 and 1316, respectively. The acoustic radiation generator 1335 and the focusing element 1337 may function as a single unit controlled by a single controller, or they may be independently controlled, depending on the desired performance of the device.

The acoustic droplet ejector 1333 may be in either direct contact or indirect contact with the external surface of each reservoir. With direct contact, in order to acoustically couple the ejector to a reservoir, it is preferred that the direct contact be wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing element have a curved surface, the direct contact approach may necessitate the use of reservoirs that have a specially formed inverse surface.

Optimally, acoustic coupling is achieved between the ejector and each of the reservoirs through indirect contact, as illustrated in FIG. 13. In the figure, an acoustic coupling medium 1341 is placed between the ejector 1333 and the base 1325 of reservoir 1313, with the ejector and reservoir located at a predetermined distance from each other. The acoustic coupling medium may be an acoustic coupling fluid, preferably an acoustically homogeneous material in conformal contact with both the acoustic focusing element 1337 and the underside of the reservoir. In addition, it is important to ensure that the fluid medium is substantially free of material having different acoustic properties than the fluid medium itself. As shown, the first reservoir 1313 is acoustically coupled to the acoustic focusing means 1337 such that an acoustic wave generated by the acoustic radiation generator is directed by the focusing element 1337 into the acoustic coupling medium 1341, which then transmits the acoustic radiation into the reservoir 1313.

In operation, reservoir 1313 and optional reservoir 1315 of the device are filled with first and second fluid samples 1314 and 1316, respectively, as shown in FIG. 13. The acoustic ejector 1333 is positioned just below reservoir 1313, with acoustic coupling between the ejector and the reservoir provided by means of acoustic coupling medium 1341. Initially, the acoustic ejector is positioned directly below sampling tip 1353 of OPI 1351, such that the sampling tip faces the surface 1317 of the fluid sample 1314 in the reservoir 1313. Once the ejector 1333 and reservoir 1313 are in proper alignment below sampling tip 1353, the acoustic radiation generator 1335 is activated to produce acoustic radiation that is directed by the focusing means 1337 to a focal point 1347 near the fluid surface 1317 of the first reservoir. As a result, droplet 1349 is ejected from the fluid surface 1317 toward and into the liquid boundary 1350 at the sampling tip 1353 of the OPI 1351, where it combines with solvent in the flow probe 1353.

The profile of the liquid boundary 1350 at the sampling tip 1353 may vary from extending beyond the sampling tip 1353 to projecting inward into the OPI 1351, as described in more detail below in relation to FIG. 13. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carryover" between droplet ejection events. Fluid samples 1314 and 1316 are samples of any fluid for which transfer to an analytical instrument is desired, and may include both a liquid component and a solid component, e.g., the magnetic particles described above and used in conjunction with the various methods described herein.

The structure of OPI 1351 is also shown in FIG. 13. Any number of commercially available continuous flow sampling probes can be used as is or in modified form, all of which, as is well known in the art, operate according to substantially the same principles. As can be seen in the FIG. 13, the sampling tip 1353 of OPI 1351 is spaced apart from the fluid surface 1317 in the reservoir 1313, with a gap 1355 therebetween. The gap 1355 may be an air gap, or a gap of an inert gas, or it may comprise some other gaseous material; there is no liquid bridge connecting the sampling tip 1353 to the fluid 1314 in the reservoir 1313. The OPI 1351 includes a solvent inlet 1357 for receiving solvent from a solvent source and a solvent transport capillary 1359 for transporting the solvent flow from the solvent inlet 1357 to the sampling tip 1353, where the ejected droplet 1349 of analyte-containing fluid sample 1314 combines with the solvent to form an analyte-solvent dilution. A solvent pump (not shown) is operably connected to and in fluid communication with solvent inlet 1357 in order to control the rate of solvent flow into the solvent transport capillary and thus the rate of solvent flow within the solvent transport capillary 1359 as well.

Fluid flow within the OPI 1351 carries the analyte-solvent dilution through a sample transport capillary 1361 provided by inner capillary tube 1373 toward sample outlet 1363 for subsequent transfer to an analytical instrument. A sampling pump (not shown) can be provided that is operably connected to and in fluid communication with the sample transport capillary 1361, to control the output rate from outlet 1363. In an example, a positive displacement pump is used as the solvent pump, e.g., a peristaltic pump, and, instead of a sampling pump, an aspirating nebulization system is used so that the analyte-solvent dilution is drawn out of the sample outlet 1363 by the Venturi effect caused by the flow of the nebulizing gas introduced from a nebulizing gas source 1365 via gas inlet 1367 (shown in simplified form in FIG. 13, insofar as the features of aspirating nebulizers are well known in the art) as it flows over the outside of the sample outlet 1363. The analyte-solvent dilution flow is then drawn upward through the sample transport capillary 1361 by the pressure drop generated as the nebulizing gas passes over the sample outlet 1363 and combines with the fluid exiting the sample transport capillary 1361. A gas pressure regulator is used to control the rate of gas flow into the system via gas inlet 1367. In an example, the nebulizing gas flows over the outside of the sample transport capillary 1361 at or near the sample outlet 1363 in a sheath flow type manner which draws the analyte-solvent dilution through the sample transport capillary 1361 as it flows across the sample outlet 1363 that causes aspiration at the sample outlet upon mixing with the nebulizer gas.

The solvent transport capillary 1359 and sample transport capillary 1361 are provided by outer capillary tube 1371 and inner capillary tube 1373 substantially co-axially disposed therein, where the inner capillary tube 1373 defines the sample transport capillary, and the annular space between the inner capillary tube 1373 and outer capillary tube 1371 defines the solvent transport capillary 1359.

The system can also include an adjuster 1375 coupled to the outer capillary tube 1371 and the inner capillary tube 1373. The adjuster 1375 can be adapted for moving the outer capillary tube tip 1377 and the inner capillary tube tip 1379 longitudinally relative to one another. The adjuster 1375 can be any device capable of moving the outer capillary tube 1371 relative to the inner capillary tube 1373. Exemplary adjusters 1375 can be motors including, but are not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the probe 1351, and the inner and outer capillary tubes 1373, 1371 can be arranged coaxially around a longitudinal axis of the probe 1351, as shown in FIG. 13. Additionally, as illustrated in FIG. 13, the OPI 1351 may be generally affixed within an electromagnetic particle capture trap 1381. The trap 1381 may be energized as needed to trap magnetic particles ejected with the sample 1314.

Combination Intake/Analysis Sub-System

Figure 14:
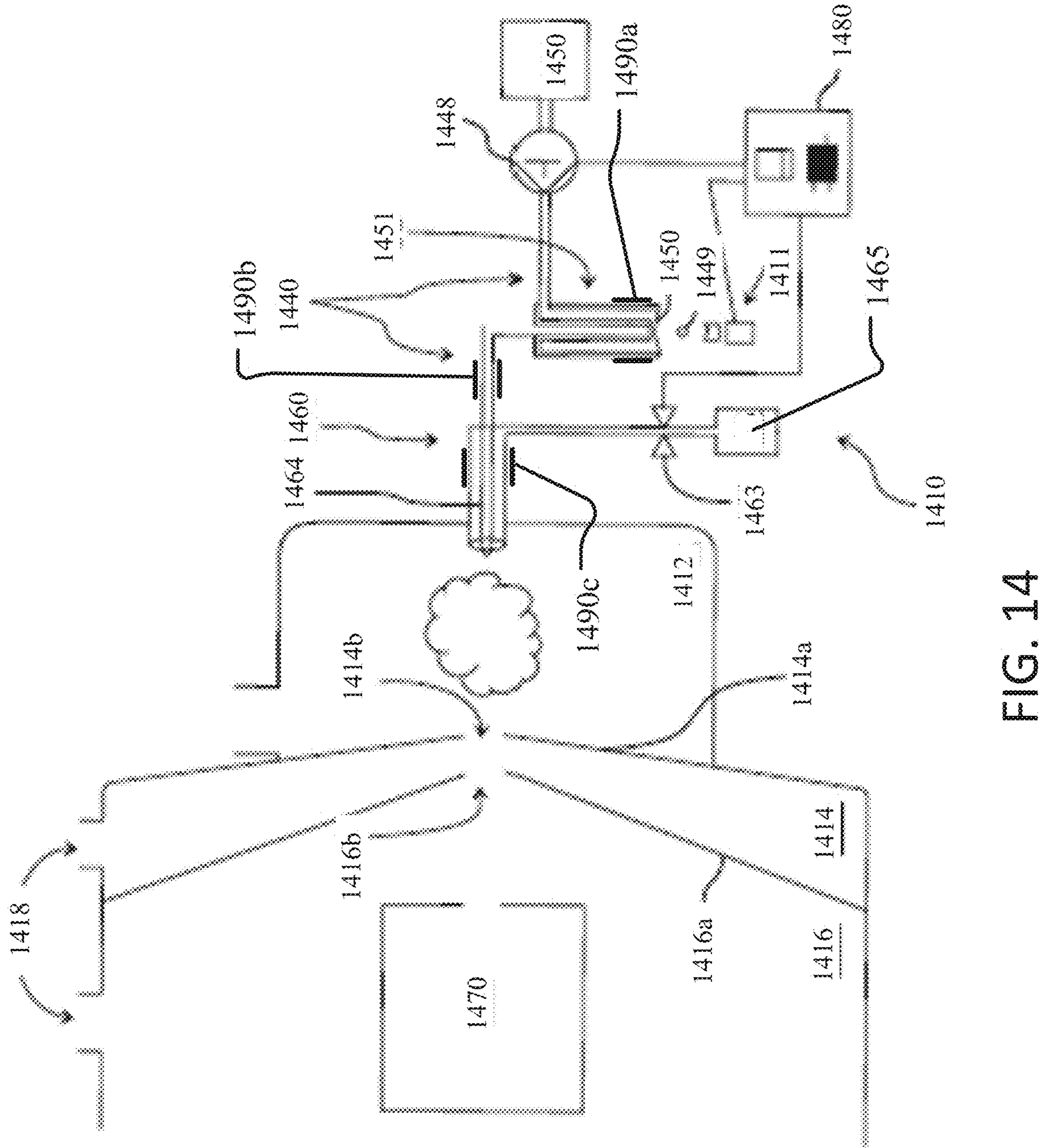
FIG. 14 depicts intake and analysis sub-systems that may be utilized with the system of FIG. 7.

FIG. 14 schematically depicts an intake and analysis sub-system 1410 for receiving, ionizing, and mass analyzing analytes received within an open end of a sampling probe 1451. The system 1410 includes an acoustic droplet injection device 1411 configured to inject a droplet 1449, from a reservoir into the open end of the sampling probe 1451. As shown in FIG. 14, the exemplary system 1410 generally includes a sampling probe 1451 (e.g., an OPI) in fluid communication with a nebulizer-assisted ion source 1460 for discharging a liquid containing one or more sample analytes (e.g., via electrospray electrode 1464) into an ionization chamber 1412, and a mass analyzer 1470 in fluid communication with the ionization chamber 1412 for downstream processing and/or detection of ions generated by the ion source 1460. A fluid handling system 1440 (e.g., including one or more pumps 1443 and one or more conduits) provides for the flow of liquid from a solvent reservoir 1450 to the sampling probe 1451 and from the sampling probe 1451 to the ion source 1460. For example, as shown in FIG. 14, the solvent reservoir 1450 (e.g., containing a liquid, desorption solvent) can be fluidly coupled to the sampling probe 1451 via a supply conduit through which the liquid can be delivered at a selected volumetric rate by the pump 1443 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, flow of liquid into and out of the sampling probe 1451 occurs within a sample space accessible at the open end such that one or more droplets can be introduced into the liquid boundary 1450 at the sample tip 1453 and subsequently delivered to the ion source 1460. As shown, the system 1410 includes an acoustic droplet injection device 1411 that is configured to generate acoustic energy that is applied to a liquid contained with a reservoir (as depicted in FIG. 13) that causes one or more droplets 1449 to be ejected from the reservoir into the open end of the sampling probe 1451. A controller 1480 can be operatively coupled to the acoustic droplet injection device 1411 and can be configured to operate any aspect of the acoustic droplet injection device 1411 (e.g., focusing means, acoustic radiation generator, automation means for positioning one or more reservoirs into alignment with the acoustic radiation generator, etc.) so as to inject droplets into the sampling probe 1451 or otherwise discussed herein substantially continuously or for selected portions of an experimental protocol by way of non-limiting example. In examples, the controller 1480 may be integrated with the system controller 734 depicted in FIG. 7.

As shown in FIG. 14, the exemplary ion source 1460 can include a source 1465 of pressurized gas (e.g., nitrogen, air, or a noble gas) that supplies a high velocity nebulizing gas flow which surrounds the outlet end of the electrospray electrode 1464 and interacts with the fluid discharged therefrom to enhance the formation of the sample plume and the ion release within the plume for sampling by 1414*b* and 1416*b*, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 1480 (e.g., via opening and/or closing valve 1463). In accordance with various aspects of the present teachings, it will be appreciated that the flow rate of the nebulizer gas can be adjusted (e.g., under the influence of controller 1480) such that the flow rate of liquid within the sampling probe 1451 can be adjusted based, for example, on suction/aspiration force generated by the interaction of the nebulizer gas and the analyte-solvent dilution as it is being discharged from the electrospray electrode 1464 (e.g., due to the Venturi effect).

In the depicted example, the ionization chamber 1412 can be maintained at an atmospheric pressure, though in some examples, the ionization chamber 1412 can be evacuated to a pressure lower than atmospheric pressure. The ionization chamber 1412, within which the analyte can be ionized as the analyte-solvent dilution is discharged from the electrospray electrode 1464, is separated from a gas curtain chamber 1414 by a plate 1414*a* having a curtain plate aperture 1414*b*. As shown, a vacuum chamber 1416, which houses the mass analyzer 1470, is separated from the curtain chamber 1414 by a plate 1416*a* having a vacuum chamber sampling orifice 1416*b*. The curtain chamber 1414 and vacuum chamber 1416 can be maintained at a selected pressure(s) (e.g., the same or different sub-atmospheric pressures, a pressure lower than the ionization chamber) by evacuation through one or more vacuum pump ports 1418.

It will also be appreciated by a person skilled in the art that the mass analyzer 1470 can have a variety of configurations. Generally, the mass analyzer 1470 is configured to process (e.g., filter, sort, dissociate, detect, etc.) sample ions generated by the ion source 1460. By way of non-limiting example, the mass analyzer 1470 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-Qlinear ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 1410 including, for example, an ion mobility spectrometer (e.g., a differential mobility spectrometer) that is disposed between the ionization chamber 1412 and the mass analyzer 1470 and is configured to separate ions based on the difference of the mobility at high- and low-fields. Additionally, it will be appreciated that the mass analyzer 1470 can comprise a detector that can detect the ions which pass through the analyzer 1470 and can, for example, supply a signal indicative of the number of ions per second that are detected. The sub-system 1410 may also include one or more bead capture features or traps 1490 that may be used to capture magnetic beads introduced thereto. The traps 1490 may be located at the OPI (at 1490*a*), the transfer conduit (at 1490*b*) or proximate the vacuum chamber (at 1490*c*).

Example Methods and Combination Subsystems for Performing Example Methods

High throughput affinity screening systems are also contemplated, for the purpose of performing methods disclosed herein in a highly automated manner and in a single, integrated system such as system 700 of FIG. 7. Generally, the automated system 700 can include separate sub-systems for performing each operation of the various methods described herein. In certain aspects, automated systems contemplated herein can comprise a well plate preparation station or sub-system configured to introduce a plurality of compounds from a compound library into an assay vessel. As above, the plurality of compounds can be any number of compounds, and in certain aspects in a range from 10 to 10,000 compounds, from 500 to 5,000 compounds, or from 1,000 to 2,500 compounds. The microplate station or sub-system may include an acoustic dispenser variably coupled to compound storage containers to transfer a portion of each selected compound from the container to the assay vessel.

Sub-systems contemplated herein also can comprise an assay module configured to conduct the binding assay on any number of assay vessels within a well plate. In certain aspects, the microplate station can include magnetic or mechanical agitators, stores of assay components, temperature controls, automated aspirators, and the like for preparing the assay mixture for mass analysis. The microplate station may also include a magnet (e.g., an electromagnet) attached to a mobile arm (e.g., the robot sub-system 704 of FIG. 7, and variably positionable within, or adjacent to, any number assay vessels for retaining one or more magnetic particle at any point during the assay.

The automated system 700 such as depicted in FIG. 7 can serially transfer a sample from each well of the well plate into an OPI of a mass spectrometer and conduct a mass analysis of each sample. In certain aspects the analysis module can include an acoustic droplet ejector or other non-contact ejector able to be coupled with any well of the well plate, so as to facilitate serial transfer of samples from a well plate containing sample. An intake or analysis sub-system may also include a magnet (e.g., electromagnet) for selective retaining a magnet particle at any point within the sub-system prior to ionization of the sample. The analysis sub-system can include a mass spectrometer, sample vaporization chamber, ionization device, mass fragment detector any additional components necessary to conduct mass spectral analysis. The analysis sub-system may also be configured to automatically correlate mass fragments detected during analysis with those expected from certain compounds within the sample in order to identify the compounds in the sample. FIGS. 15-23B depict and describe various capacities of an automated system that process, deliver, and analyze samples including and not including magnetic particles. Any of the configurations and methods depicted in these figures may be utilized in the system 700 of FIG. 7.

Figure 15:
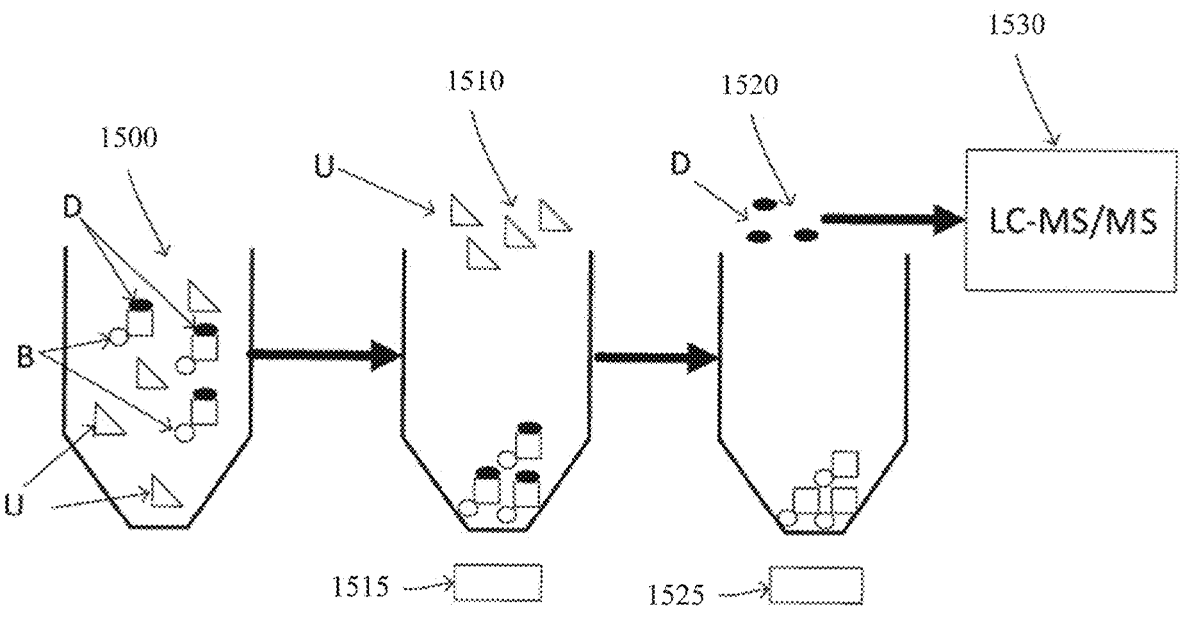
FIG. 15 depicts a method of using magnetic particles to capture drug molecules with protein binding affinity.

FIG. 15 depicts a sub-system using magnetic particles to capture drug molecules with protein binding affinity. First, magnetic beads (B) are introduced to a sample vessel 1500 containing drug molecule candidates (U and D) in solution. Drug molecule candidates with affinity (D) then bind to the magnetic beads. The unbound drug molecules (U) are then removed in a wash vessel 1510 while the beads (B) and bound drug molecule candidate (D) are retained in the vessel via a magnetic field from magnet 1515. The washed beads are removed from the wash vessel and introduced into a separation vessel 1520 where the drug molecule candidate (D) is isolated from the beads using a solvent. The isolated drug molecule candidate (D) is then aspirated from the separation vessel 1520 while the magnetic beads are held in place via a magnetic field from magnet 1525. The magnet 1525 is depicted schematically, magnets would be typically be disposed proximate a sidewall of the vessel to leave a centerline clear for liquid transfer. The aspirated drug molecule candidate is then eluted over time into a LC-MS/MS 1530 for analysis. The magnetic beads can then be magnetically removed from the separation vessel 1520.

Figure 16:
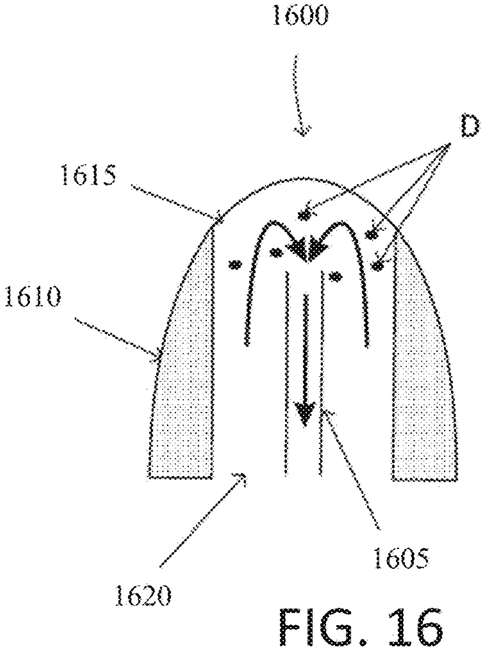
FIG. 16 depicts another example of an open port interface that may be utilized with the system of FIG. 7.

With reference to FIG. 16, an OPI 1600 is shown having inner channel 1605 as a first cylindrical member disposed within an outer channel 1610 as a second cylindrical member arranged in a co-axial arrangement with the inner channel 1605, and an open-ended port 1615. Additional details of the OPI 1600 are provided below with reference to various examples.

Figure 17:
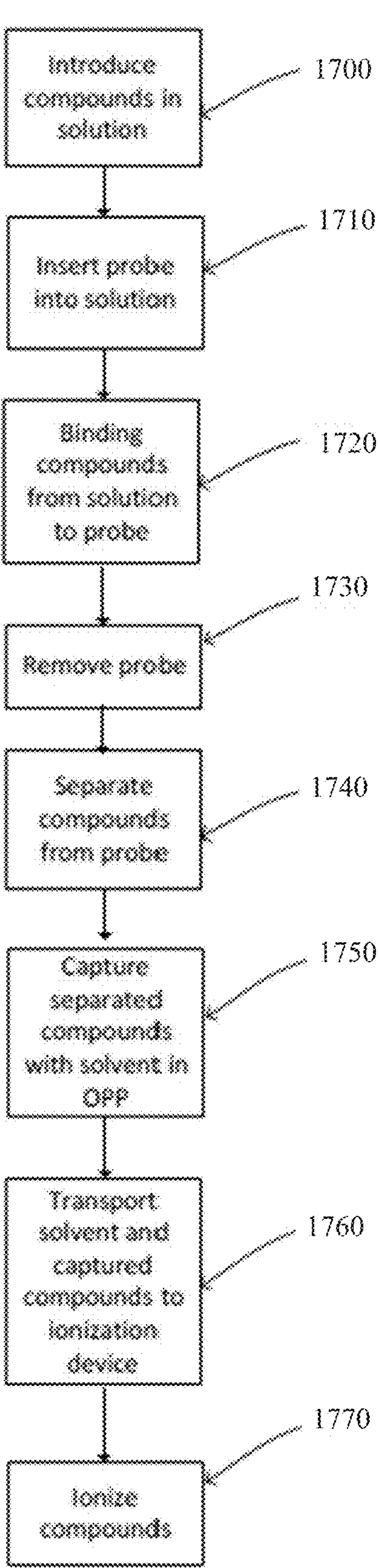
FIG. 17 depicts an example of a method for identifying and separating compounds based on a selected affinity.

FIG. 17 discloses an example for identifying and separating drug candidates based on a selected affinity, with reference to the OPI 1600 shown in FIG. 16. At 1700, a plurality of drug candidates are introduced within the assay vessel as a solution. At 1710, a particle is inserted into the solution, where the particle includes a surface treatment operative to bind with one or more compounds based on selected affinity. One or more of the compounds then bind to the particle at 1720. In an example, the substrate surface may comprise a Solid Phase Microextraction (SPME) fiber that can contain an embedded protein with binding affinity. The substrate surface may be any material configured to hold the protein and can include various examples such as a mesh material or blade like surface or a high surface area solid phase sample device, for example, as described in PCT Publication No. WO/2020/003233, the disclosure of which is hereby incorporated by reference herein in its entirety. In other examples, as discussed below, the surface treatment can include magnetic material such as beads.

The particle with bound one or more compounds is then removed from the solution at 1730. At 1740, the one or more compounds are separated from the particle. At 1750, the separated one or more compounds are captured with flowing organic solvent at the open-ended port 1615 of OPI 1600. At 1760, the solvent and captured one or more compounds at the open-ended port 1615 of OPI 1600 are transported to an ionization device.

Figure 18:
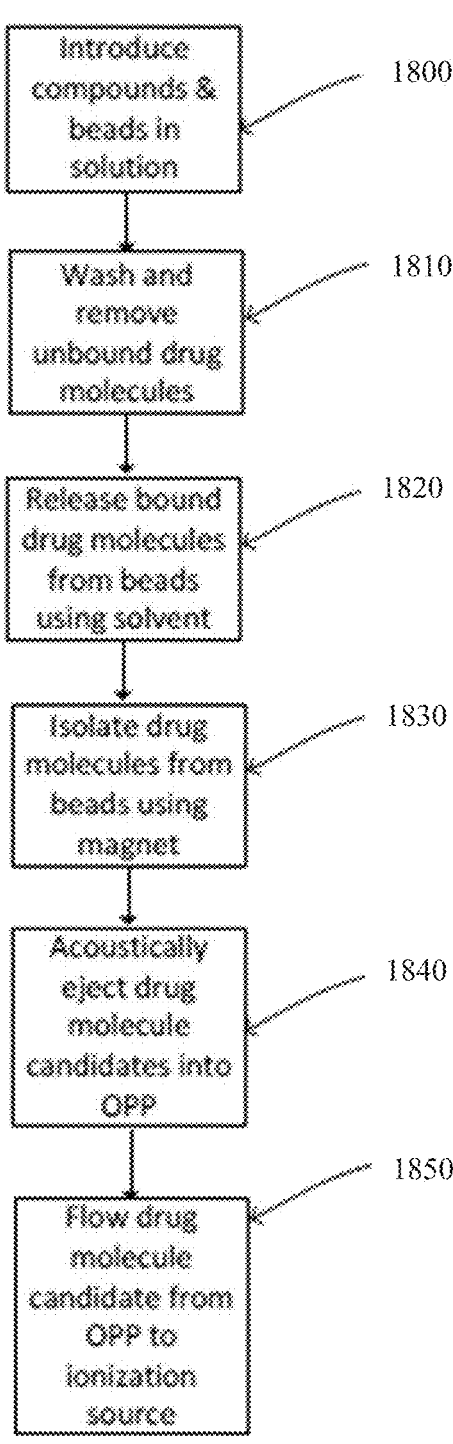
FIG. 18 depicts another example of a method for identifying and separating compounds based on a selected affinity.
Figure 19:
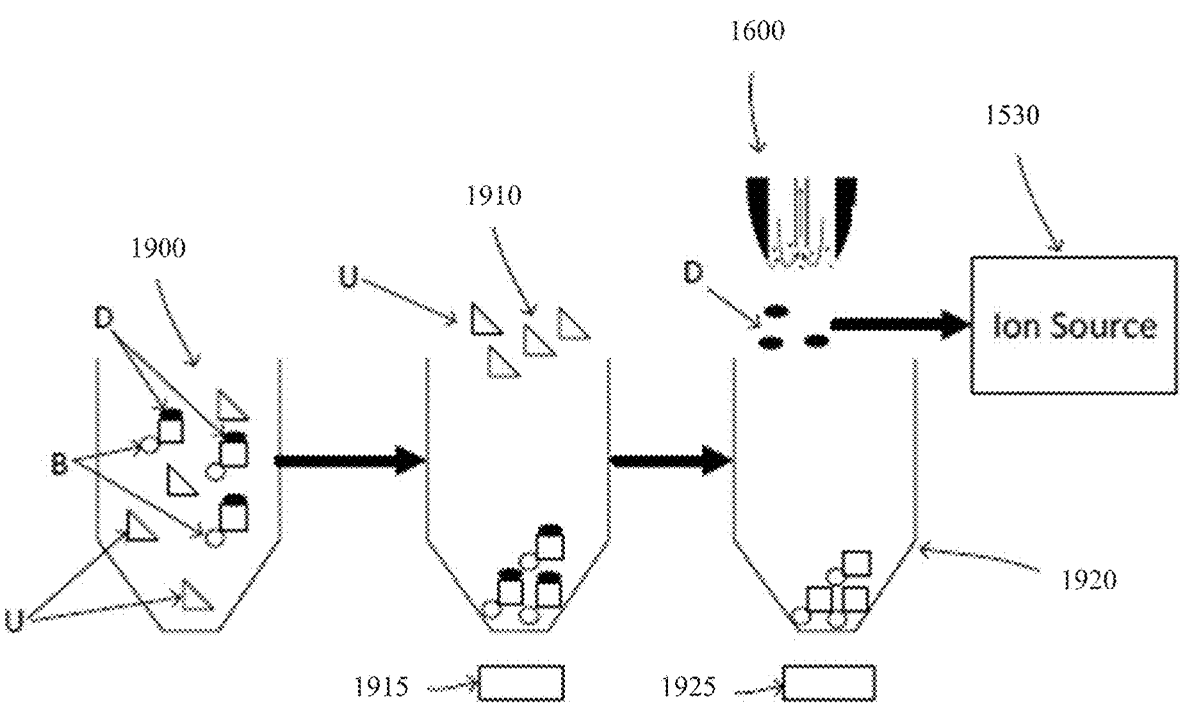
FIG. 19 depicts sub-systems of the system of FIG. 7 that may be used for implementing the method of FIG. 18.

In an example, a method is provided for identifying and separating compounds based on a selected affinity, as set forth in FIG. 18 with reference to the system shown in FIG. 19. At 1800, a plurality of drug molecule candidates (U and D) and magnetic beads (B) in solution are introduced to sample vessel 1900, for example using an electromagnetic sampling device or probe to which the beads are magnetically attached, such that drug molecule candidates with affinity (D) bind to the magnetic beads. At 1810, the beads (B) and bound drug molecule candidates (D) are transferred from the sample vessel 1900 to wash vessel 1910, for example using the electromagnetic sampling device or probe, whereupon the unbound drug molecules (U) are removed via washing while the beads (B) and bound drug molecule candidates (D) are retained in the vessel via a magnetic field from magnet 1915. At 1820, the washed beads with bound drug molecule candidates are removed from the wash vessel and introduced into separation vessel 1920, for example using the electromagnetic sampling device or probe, where the drug molecule candidates (D) are released from the beads using organic solvent. At 1830, the drug molecule candidates (D) are isolated from the magnetic beads (B) via magnet 1925. In FIG. 19, magnet 1925 is depicted schematically below the separation vessel 1920. In order to accommodate a non-contact ejector for ejecting samples to the OPI 1600, one or more magnets 1920 would be disposed proximate side walls of the vessel 1920. At 1840, the drug molecule candidates (D) are acoustically ejected from separation vessel 1920 into OPI 1600 (as numbered consistently with FIG. 16). Within the OPI 1600, capture fluid travels towards the tip end 1615 through the annular space 1620 between the two cylindrical members and then travels away from the tip end through the inner cylinder as depicted in the arrows in the figure defining the fluid path. The capture fluid effectively eliminates the need to clean the sample. At 1850, the solvent and ejected drug candidates (D) flow from the tip end 1615 to the MS ionization source 1530. Optionally or, if necessary, the drug molecule candidate (D) can be separated from the unbound drug molecules (U) using differential mobility spectrometry (DMS) or MS techniques (e.g. fragmentation patterns in MS-MS, etc.).

Figure 20:
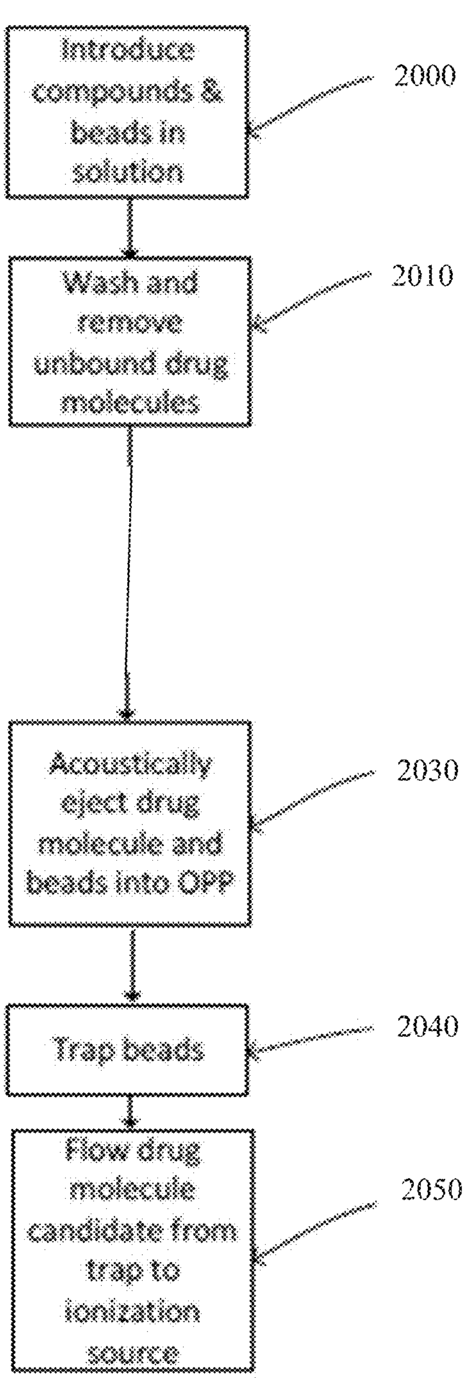
FIG. 20 depicts another example of a method for identifying and separating compounds based on a selected affinity.
Figure 21:
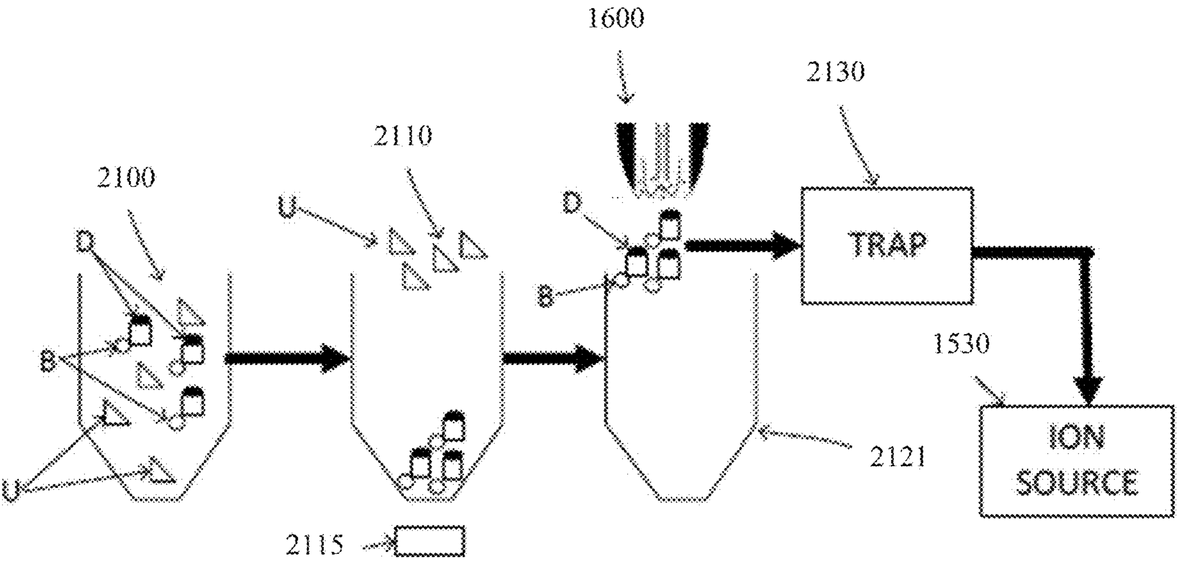
FIG. 21 depicts sub-systems of the system of FIG. 7 that may be used for implementing the method of FIG. 20.

In a further example, a method is provided for identifying and separating compounds based on a selected affinity, as set forth in FIG. 20 with reference to the system shown in FIG. 21. At 2000, a plurality of drug molecule candidates (U and D) and magnetic beads (B) in solution are introduced to sample vessel 2100, for example using an electromagnetic sampling device or probe to which the beads are magnetically attached, such that drug molecule candidates with affinity (D) bind to the magnetic beads. At 2010, the beads (B) and bound drug molecule candidates (D) are transferred from the sample vessel 2100 to wash vessel 2110, for example using the electromagnetic sampling device or probe, whereupon the unbound drug molecules (U) are removed via washing while the beads (B) and bound drug molecule candidates (D) are retained in the vessel via a magnetic field from magnet 2115. The magnet 2125 is depicted schematically, magnets would be typically be disposed proximate a sidewall of the vessel to leave a centerline clear for liquid transfer. At 2030, the drug molecule candidates (D) and beads (B) are acoustically ejected from separation vessel 2120 into OPI 1600 (as numbered consistently with FIG. 16). Within the OPI 1600, capture fluid travels towards the tip end 1615 through the annular space 1620 between the two cylindrical members and then travels away from the tip end through the inner cylinder as depicted in the arrows in the figure defining the fluid path. The capture fluid effectively eliminates the need to clean the sample. At 2040, the solvent, beads (B) and drug candidates (D) flow from the tip end 1615 to an in-line trap 2130 where the beads (B) are trapped (1940). At 2050, the solvent and ejected drug candidates (D) flow from the trap 2130 to the MS ionization source 1530. Alternatively, rather than separating the drug molecule candidates (D) from the beads in separation vessel 2120, the drug molecule candidates (D) may be separated from the beads within OPI 1600, where the capture fluid is a solvent operative to release the bond between the drug molecule candidates (D) and the beads. For acoustic ejection at 2030, it is preferable that the drug molecule candidates (D) be uniformly suspended in the sample solution within separation vessel 2120, for example by mechanically agitating the separation vessel 2120 before dispensing or by integrating an electromagnetic mixer within the acoustic dispensing system.

Figure 22:
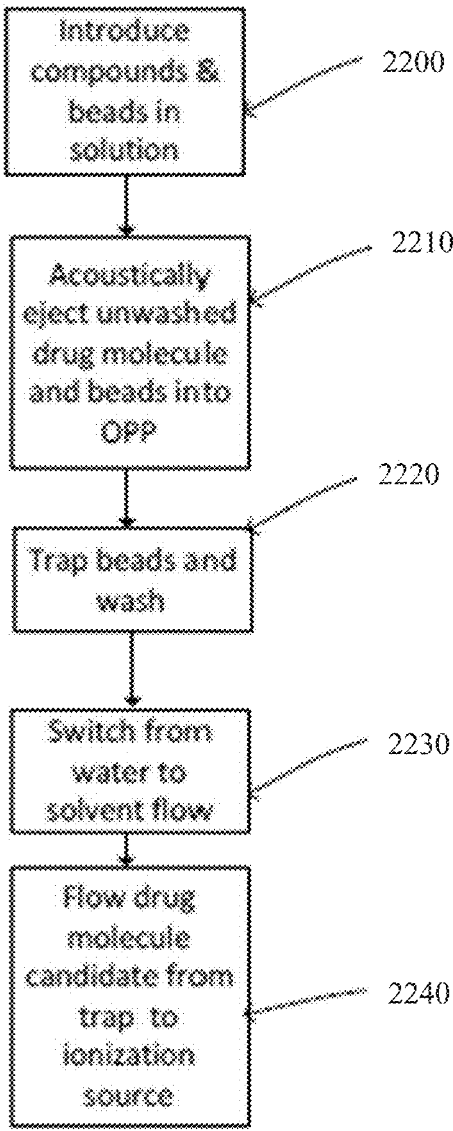
FIG. 22 depicts another example of a method for identifying and separating compounds based on a selected affinity.
Figure 23A:
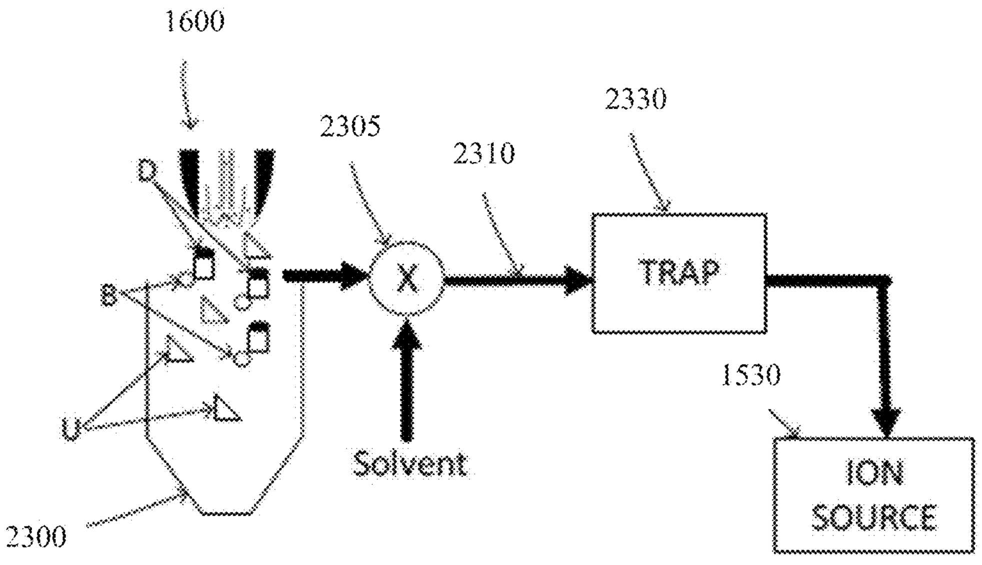
FIG. 23A depicts sub-systems of the system of FIG. 7 that may be used for implementing the method of FIG. 22.

In an additional example, a method is provided for identifying and separating compounds based on a selected affinity, as set forth in FIG. 22 with reference to the system shown in FIG. 23A. At 2200, a plurality of drug molecule candidates (U and D) and magnetic beads (B) in solution are introduced to sample vessel 2300, for example using an electromagnetic sampling device or probe to which the beads are magnetically attached, such that drug molecule candidates with affinity (D) bind to the magnetic beads. At 2210, the unwashed drug molecule candidates (D) and beads (B) are acoustically ejected from sample vessel 2300 into OPI 1600 (as numbered consistently with FIG. 16). Within the OPI 1600, capture fluid travels towards the tip end 1615 through the annular space 1620 between the two cylindrical members and then travels away from the tip end through the inner cylinder as depicted in the arrows in the figure defining the fluid path. The capture fluid (e.g. water) effectively eliminates the need to clean the sample. At 2220, the solvent, beads (B) and unwashed drug candidates (D) flow from the tip end 1615 to an in-line trap 2330 where the beads (B) are trapped (2140) and the drug candidates (D) are washed to remove unbound drug molecules (U). At 2230, the flow of capture fluid (water) is switched to organic solvent flow via a valve 2305 to separate the drug molecule candidates (D) from the beads (B). At 2240, the solvent and selected drug candidates (D) flow via transport line 2310 from the trap 2330 to the MS ionization source 1530.

Figure 23B:
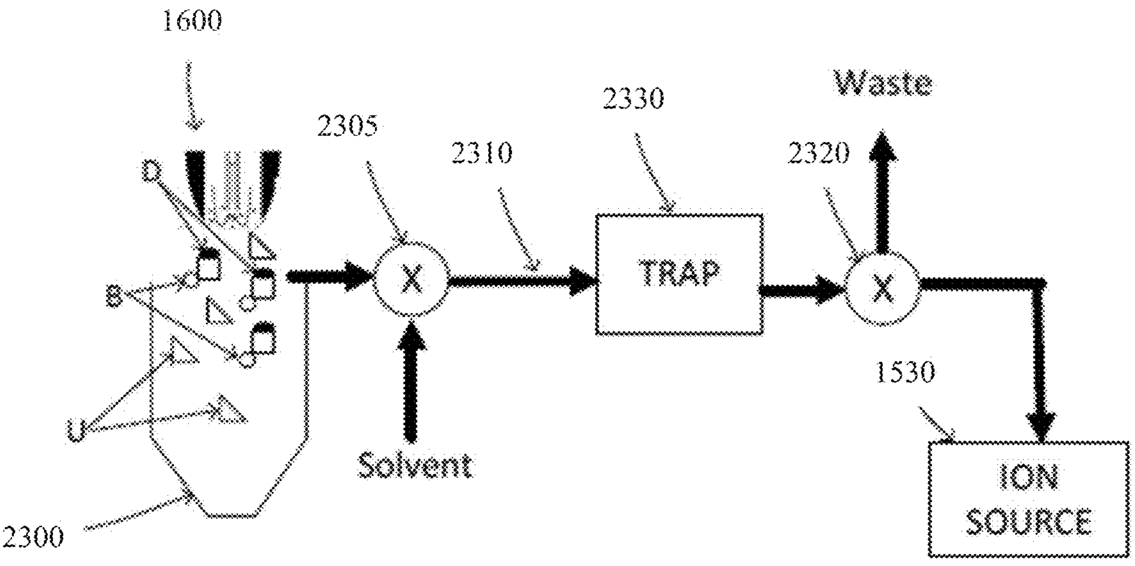
FIG. 23B depicts an alternative example of the sub-systems of FIG. 23A.

Different examples of trap 2330 are contemplated, including filters or size traps, or a permanent magnet that can be replaced from time to time, or an electromagnet that can be energized to trap magnetic beads (B) and then de-energized, for example during a cleaning cycle, to release any captured magnetic beads. Another example is depicted in FIG. 23B, the transfer line 2305 may include valve(s) 2320 to redirect the flow of capture fluid to a waste vessel and thereby avoid releasing magnetic beads into the ionization source 1530 during the cleaning cycle, when the electromagnet is de-energized to release captured beads.

Returning to FIG. 21, the trap 2030 may be a magnetic trap at the tip end 1615 of OPI 1600 (e.g., electromagnets surrounding one or both of the first cylindrical member 1605 and/or second cylindrical member 1610), and wherein a clearing cycle may be performed with a solvent-based capture fluid to release the beads from the trap after the washed drug candidates have been conveyed to the MS ionization source 1530.

In another example, the trap may be disposed at the ionization source 1530 wherein bead trajectory separates from ions at entrance to the MS ionization source 1530 due to the beads being much heavier than the ions, for use with the systems shown in FIGS. 19 and 23A. In a further example, the trap may be an in-line magnetic trap on transport line of the system shown in FIG. 23A. It is contemplated that the in-line magnetic trap may be a replaceable section of transport line that has a sufficient magnetic field to capture the magnetic beads (B) within the transport line. It is also contemplated that in the system of FIG. 19, employing acoustic ejection of drug molecule candidates (D) isolated from the beads (B), a permanent magnet guard trap may be included to protect the ionization source 1530 and MS form unintentional ejection of magnetic beads from the vessel. Although the systems depicted in FIGS. 19 and 21 discuss the use of separate sample, wash and separation vessels, it is contemplated that sample preparation may be performed in a single vessel or multiple vessels. In each of the examples set forth in FIGS. 18-23B, as an alternative to introducing the compounds drug molecules with affinity to the solid phase surfaces of the magnetic particles (B), it is contemplated that the particles (B) can be added after the protein-drug integration in free solution, and used to fish-out the protein-drug complex rather than the protein pre-immobilized on magnetic particles (B).

System Controller

Figure 24:
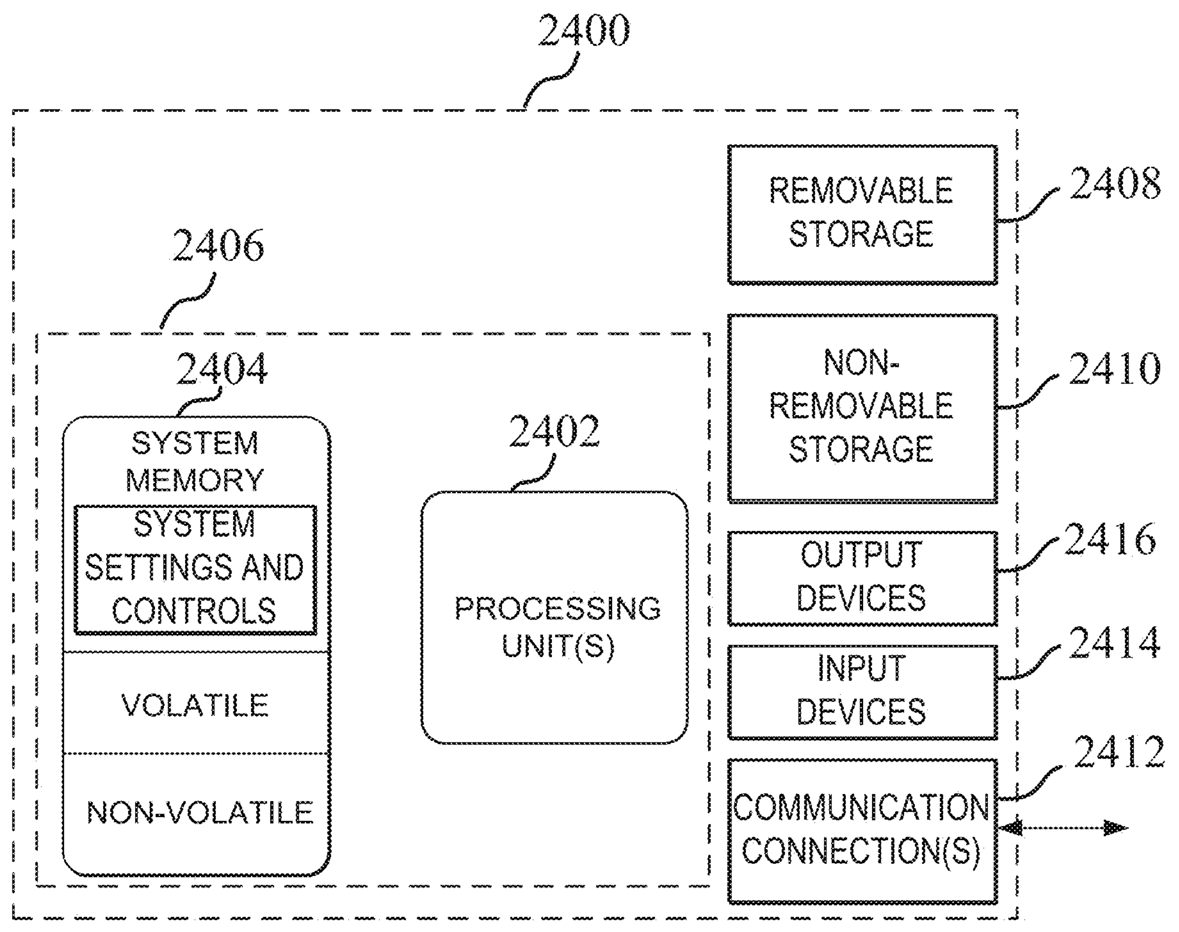
FIG. 24 depicts an example of a suitable operating environment in which one or more of the present examples can be implemented.

FIG. 24 depicts one example of a suitable operating environment 2400 in which one or more of the present examples can be implemented. This operating environment may be incorporated directly into the controller for a mass spectrometry system, e.g., such as the controller 734 depicted in FIG. 7. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like. In view of the portability of the processing systems described herein, a laptop or tablet computer may be desirably connected via a wired or wireless connection to a controller 734 such as depicted in FIG. 7, and may send the appropriate control signals before, during, and after an electrode position-setting event, so as to control operation of the various components of the system.

In its most basic configuration, operating environment 2400 typically includes at least one processing unit 2402 and memory 2404. Depending on the exact configuration and type of computing device, memory 2404 (storing, among other things, instructions to control the transport liquid pump, sensors, valves, gas source, etc., or perform other methods disclosed herein) can be volatile (such as RAM), non-volatile (such as ROM, flash memory, etc.), or some combination of the two. This most basic configuration is illustrated in FIG. 24 by dashed line 2406. Further, environment 2400 can also include storage devices (removable, 2408, and/or non-removable, 2410) including, but not limited to, magnetic or optical disks or tape. Similarly, environment 2400 can also have input device(s) 2414 such as touch screens, keyboard, mouse, pen, voice input, etc., and/or output device(s) 2416 such as a display, speakers, printer, etc. Also included in the environment can be one or more communication connections 2412, such as LAN, WAN, point to point, Bluetooth, RF, etc.

Operating environment 2400 typically includes at least some form of computer readable media. Computer readable media can be any available media that can be accessed by processing unit 2402 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 2400 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 2400 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 2400 is part of a network that stores data in remote storage media for use by the computer system 2400.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A system of analyzing a sample, the system comprising:

a sample preparation sub-system for preparing at least one sample in a sample vessel;

a magnetic bead storage sub-system for storing a plurality of magnetic beads in a suspension;

a magnetic bead transfer sub-system configured to transfer the plurality of magnetic beads from the suspension to the sample;

a sample intake sub-system for receiving the at least one sample;

a mass spectrometer (MS) communicatively coupled to the sample intake sub-system; and a transfer sub-system comprising a tool for moving the sample vessel from the sample preparation sub-system to the sample intake sub-system.

2. The system of claim 1, wherein the sample preparation sub-system comprises an electromagnetic mixer for mixing the sample with a plurality of magnetic beads.

3. The system of claim 1, wherein the sample preparation sub-system comprises a mechanical mixer for mixing the sample with a plurality of magnetic beads.

4. The system of claim 1, further comprising a mixing sub-system for mixing a plurality of magnetic beads in a liquid.

5. The system of claim 1, wherein the magnetic bead transfer sub-system comprises at least one of an electromagnetic tool and a magnetic tool.

6. The system of claim 1, wherein the sample intake sub-system comprises a liquid chromatography (LC) column.

7. The system of claim 1, wherein the sample intake sub-system comprises an open port interface (OPI).

8. The system of claim 7, wherein the sample intake sub-system comprises an acoustic droplet ejector (ADE).

9. An automated method of analyzing a sample, the automated method comprising:

introducing a plurality of magnetic beads to the sample, wherein the sample is contained within a sample vessel, by transferring the plurality of magnetic beads from a suspension to the sample;

transferring the sample vessel to a sample intake sub-system;

introducing the sample from the sample vessel to the sample intake sub-system, wherein the sample intake sub-system is communicatively coupled to a mass spectrometer (MS);

analyzing the sample with the MS; and removing the plurality of magnetic beads from the sample prior to analysis of the sample by the MS.

10. The automated method of claim 9, wherein removing the plurality of magnetic beads from the sample prior to analysis of the sample by the MS comprises removing the plurality of magnetic beads from the sample prior to introducing the sample to the sample intake sub-system.

11. The automated method of claim 9, wherein introducing the sample from the sample vessel to the sample intake sub-system comprises ejecting the sample and the plurality of magnetic beads from the sample vessel to the sample intake sub-system.

12. The automated method of claim 9, further comprising introducing at least one reagent to the sample vessel containing the sample and the plurality of magnetic beads.

13. The automated method of claim 12, further comprising incubating the at least one reagent, the sample, and the plurality of magnetic beads.

14. The automated method of claim 10, wherein removing the plurality of magnetic beads from the sample comprises at least one of:

removing the plurality of magnetic beads from the sample vessel prior to analyzing the sample; and removing the sample from the sample vessel containing the sample and the plurality of magnetic beads, prior to analyzing the sample.

15. The automated method of claim 14, wherein removing the plurality of magnetic beads from the sample vessel comprises inserting a magnet into the sample vessel.

16. The automated method of claim 9, wherein removing the plurality of magnetic beads from the sample comprises capturing the plurality of magnetic beads in at least one of an open port interface, a transfer conduit, an ionization source, and a vacuum chamber.

17. The automated method of claim 9, wherein analyzing the sample comprises eluting the sample.

18. The automated method of claim 9, wherein introducing the sample from the sample vessel to the sample intake sub-system comprises ejecting the sample.

* * * * *